(12) United States Patent
Remmel et al.

(10) Patent No.: US 11,691,486 B2
(45) Date of Patent: Jul. 4, 2023

(54) OPENABLE STRUCTURE

(71) Applicant: European Trailer Systems GmbH, Moers (DE)

(72) Inventors: Roger Remmel, Remscheid (DE); Marcus Leukers, Kalkar (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 19 days.

(21) Appl. No.: 17/269,886

(22) PCT Filed: Aug. 20, 2019

(86) PCT No.: PCT/DE2019/100752
§ 371 (c)(1),
(2) Date: Feb. 19, 2021

(87) PCT Pub. No.: WO2020/038531
PCT Pub. Date: Feb. 27, 2020

(65) Prior Publication Data
US 2021/0323387 A1    Oct. 21, 2021

(30) Foreign Application Priority Data
Aug. 20, 2018   (DE) .......................... 202018104786.8

(51) Int. Cl.
*B60J 7/06* (2006.01)
*B62D 33/04* (2006.01)

(52) U.S. Cl.
CPC .............. *B60J 7/065* (2013.01); *B62D 33/04* (2013.01)

(58) Field of Classification Search
CPC ... B60J 7/061; B60J 7/062; B60J 7/064; B60J 7/065; B60J 7/068; B60J 7/102;
(Continued)

(56) References Cited

U.S. PATENT DOCUMENTS

| 3,964,781 A | 6/1976 | Fenton |
| 4,203,174 A | 5/1980 | Shults |

(Continued)

FOREIGN PATENT DOCUMENTS

| DE | 1225976 A | 9/1966 |
| DE | 10224157 A1 | 12/2003 |

(Continued)

*Primary Examiner* — Joseph D. Pape
*Assistant Examiner* — Veronica M Shull
(74) *Attorney, Agent, or Firm* — Nath, Goldberg & Meyer; Joshua B. Goldberg

(57) ABSTRACT

An openable superstructure for a substructure (14), i.e., a self-propelled truck, a truck, a semi-trailer, a trailer, a container, a dump truck, a railway wagon, a building or the like, comprising a foldable top frame (16), a cover (12) for connection to the top frame (16), in particular a tarpaulin, and a drive (70) for folding in and/or out the top frame (16). The drive (70) causes at least one at least tension-resistant tension element (71) to perform a movement and which can be coupled to a distal carriage (32') of the top frame (16), moving the distal carriage (32') back and/or forth based on the drive's actuation direction. The drive (70) comprises a driven first rotating body (73) and a second rotating body (74), arranged adjacent to one another, forming a drive device (75) The tension-resistant tension element (71) is wound several times around the drive device (75).

25 Claims, 10 Drawing Sheets

(58) Field of Classification Search
CPC .. B60J 7/12; B60J 7/1204; B60J 7/104; B60P 7/02; B60P 7/04; B62D 33/04
USPC ............ 296/100.01, 100.11, 100.15, 100.12; 105/377.02, 377.09; 160/84.06
See application file for complete search history.

(56) References Cited

U.S. PATENT DOCUMENTS

| | | | |
|---|---|---|---|
| 8,240,740 B2* | 8/2012 | Chenowth | B60J 7/062 296/100.11 |
| 2003/0222483 A1* | 12/2003 | Bohm | E05F 11/535 296/223 |
| 2015/0188481 A1* | 7/2015 | Chenowth | H02H 7/085 74/125 |
| 2017/0259652 A1* | 9/2017 | Cramaro | B60J 7/068 |

FOREIGN PATENT DOCUMENTS

| | | |
|---|---|---|
| DE | 102008022870 B3 | 6/2009 |
| DE | 102012106804 A1 | 6/2013 |
| DE | 102017111138 A1 | 11/2017 |
| FR | 2480203 A1 | 10/1981 |
| FR | 2505904 A1 | 11/1982 |
| GB | 1545196 | 5/1979 |
| JP | 59186734 A | 10/1984 |
| LU | 81931 A1 | 4/1980 |
| WO | 9633882 A1 | 10/1996 |

* cited by examiner

OPENABLE STRUCTURE

This is a National Phase Application filed under 35 U.S.C. 371 as a national stage of PCT/DE2019/100752, filed Aug. 20, 2019, an application claiming the benefit of German Application No. 202018104786.8, filed Aug. 20, 2018, the content of each of which is hereby incorporated by reference in its entirety.

The invention relates to an openable superstructure, for example a tarpaulin superstructure, for a substructure, such as a self-propelled motor vehicle, a truck, a semitrailer, a trailer, a container, a dump truck, a railway wagon, a building or the like, comprising a foldable top frame, a cover that can be connected to the top frame, in particular a tarpaulin, and a drive for folding in and/or out the top frame, wherein the drive causes at least one tension element which is at least tension-resistant to perform a movement, wherein the at least one tension element which is at least tension-resistant can be coupled to a distal carriage of a top frame and moves the carriage back and/or forth as a function of an actuation direction of the drive.

In practice, tarpaulin superstructures for substructures are known which have a drive with which the top frame can be folded in or out, wherein the drive transmits a movement to one or more carriages of the top frame via a tension element which is at least tension-resistant designed as a rope or wire. The power for the drive is usually transmitted to the carriage by a motor that pulls the tension element, wherein the motor is connected to its own energy supply in the region of the substructure due to the large forces that occur. The disadvantage here is that space for the energy supply is lost and that the energy supply also has to be recharged regularly. Furthermore, it is necessary to design the drive for relatively large loads, since the power of the drive is also required to hold the movable parts of the top frame in an open position when the dump truck is tipped. This results in high energy consumption, and the currents flowing in the power network are often so high that the corresponding power consumption is no longer guaranteed. In particular, the known drives no longer work reliably if the substructure is not on a flat surface, but on a hill or at an angle with one side on the sidewalk. The known drives are particularly energy-consuming when the moving parts of the top frame are opened as a whole and the last sections of the carriage have to be moved against a corresponding resistance. Finally, the known drives are not flexible enough to reliably overcome load peaks that arise, for example, when folding tarpaulin folding aids WO 96 33 882 A1 shows an openable superstructure for a substructure, comprising a collapsible top frame with a plurality of hoops, to which a cover in the form of a tarpaulin can be connected, wherein a manual drive causes a single pull rope to move as a pulling element. The at least one tension element which is at least tension-resistant is designed as an endless cable and is coupled to the two distal end pieces of the hoops, each of which can be moved back and forth in a U-shaped guide, wherein the coupling locally fixes a distal end piece on the cable via corresponding cleats. The corresponding distal hoop is moved forwards and/or backwards as a function of an actuation direction of the drive, with any slippage in the rollers not causing the hoop to tilt due to the endless design of the cable. The drive here comprises a drive roller which is rigidly connected to the crank and can be driven accordingly in one or the other direction.

U.S. Pat. No. 3,964,781 A describes an openable superstructure for a substructure, comprising a collapsible tarpaulin, which is displaceable on a rigid frame delimiting the substructure upwards, wherein an endless cable is provided on each longitudinal side, which is connected to the tarpaulin, wherein in the front area of the substructure, a motorized or manually driven shaft is provided which is coupled to a roller on which the cable rotates. The cable is laid one and a half times over the front roller, and once by 180° around a rear deflection roller. The front rollers on both long sides are each provided as an extension of the shaft. The disadvantage of the known superstructure is the fact that the top frame cannot be folded up and that the two drive cables on the two long sides of the substructure are mutually independently continuously endless, so that in the event of resistance or slippage, the two drive cables no longer run synchronously and the tarpaulin tilts or tears accordingly. Due to the direct connection of the tarpaulin to the cable without interposed carriages, the tarpaulin does not come up, rather it is folded up in an uncontrolled manner.

DE 102 24 157 A1 describes a cover for the sliding roof of a passenger vehicle that can be displaced along parallel guides, in which an electric motor drive with an output shaft simultaneously drives a lower winding roller and an upper winding roller, wherein with a tension element designed as a drive cable, which is coupled to a driver of the cover, one end is wound several times on the lower winding drum and the other end several times on the upper winding drum, wherein the drive cable is guided over further deflection rollers. For this purpose, the ends of the drive cable are attached to the respective winding drums. A middle winding drum, which is arranged axially between the lower winding drum and the upper winding drum, and which is also looped around the drive cable several times, is freely rotatable and follows the winding movement of the lower winding drum and the upper winding drum by the drive cable moving. Ultimately, one winding drum is used to pull the cover in one direction and the other winding drum is used to pull the cover in the other direction.

DE 1 225 976 A describes a cable drum which can be rotated about a bearing journal and which has a toothed ring which is designed with a shaft journal passing through a pinion for receiving a hand crank in order to set the cable drum in motion. A total of two traction cables are connected at their ends to the cable drum, wherein four cable grooves are provided on the circumference of the cable drum which accommodate each of the ends of the traction cables when the cable drum is rotated. The cable drum is used to move a sliding roof in a motor vehicle, wherein the maximum rotation of the cable drum is limited by pins engaging in a groove.

US 2015 018 84 81 A1 describes an openable superstructure for a substructure, comprising two tarpaulin sections which are connected to a shaft running in the longitudinal direction, wherein the shaft is rotatable around its axis for the common winding of the two tarpaulin sections and additionally is displaceable in the direction of one of the two longitudinal sides of the tarpaulin superstructure. A separate motor is provided for the axial displacement and for the rotary movement, wherein the one motor drives a drum on the two tension elements, which are each coupled to one end of a rod that delimits the tarpaulin section. Here, the power supplied by the motor is recorded, as is the duration of the current power and, if a safety period in which the threshold value of the power consumption is exceeded, the power supply is interrupted.

DE 10 2008 022 870 B3 describes a device for detecting whether an electromechanical secondary drive for a vehicle wing of a passenger vehicle is defective. For this purpose, a threshold value is calculated, which is calculated as a limiting current for an electric primary drive as a function of the temperature and an angle of inclination, and an evaluation unit records the power consumption of the electric primary drive and recognizes that the secondary drive is defective if the threshold value is exceeded.

DE 10 2017 111 138 A1 describes a passenger vehicle with a pivotable loading flap, in which an actuator with a motor drives the loading flap between an open position and a closed position. A control is provided which, depending on the ambient temperature, the orientation and the direction, specifies the most favorable closing forces for energy.

DE 10 2012 106 804 A1 describes an actuating device for the sliding roof of a vehicle, in which both a movable cover and a movable sun visor can be operated with just one motor, which for this purpose provides a planetary gear in whose toothed wheels electromagnetically operated locking pins can be engaged.

U.S. Pat. No. 4,203,174 A describes an openable cover for a swimming pool, in which a tarpaulin can be rolled up on a roller arranged on one end side of the swimming pool and can be unrolled again from this. At the end of the tarpaulin, a retaining hoop is incorporated, which is connected at both ends to a circumferential tension element, which is guided via pulleys with a rotatable disc that is mounted on a shaft. The shaft that drives both pulleys is coupled to a coupling that is driven by a motor via a belt, wherein another coupling drives a shaft that winds up the tarpaulin. Magnetic switches are provided to indicate whether the tarpaulin is fully open or fully closed. A disadvantage of the known device is the fact that tilting can occur as a result of slippage or play on one of the two sides.

It is the object of the invention to provide an openable superstructure which improves the folding-in and/or unfolding of the top frame that is accomplished by a drive.

This object is achieved according to the invention by an openable superstructure with the features of an independent claim.

According to an aspect of the invention, an openable superstructure for a substructure, such as a self-propelled truck, a truck, a semitrailer, a trailer, a container, a dump truck, a railway wagon, a building or the like is created, the superstructure comprising a collapsible top frame, a cover that can be connected to the top frame, in particular a tarpaulin, and a drive for folding in and/or unfolding the top frame, wherein the drive causes at least one tension element that is at least tension-resistant to move, wherein the at least one tension element which is at least tension-resistant can be coupled with a distal carriage of the top frame and moves the carriage forwards and/or backwards as a function of an actuation direction of the drive. The superstructure distinguishes in that the drive comprises a driven first rotating body, that the drive comprises a second rotating body, that the first and second rotating bodies are arranged adjacent to one another and form a drive device, and that the at least one tension element which is at least tension-resistant is wrapped or placed around the drive device formed from the first cylinder and the second cylinder several times. This advantageously ensures that the force is transmitted from the driven first rotating body to the at least one tension element which is at least tension-resistant, so that the at least one tension element which is at least tension-resistant does not migrate in the direction of the axis of the first rotating body and/or the second rotating body and get jammed there even when the carriage is shifted back and forth several times. Rather, the force transmitted from the driven first rotating body to the at least one tension element which is at least tension-resistant is reliably transmitted to the carriage of the top frame, so that it can be displaced precisely and reproducibly into different opening positions. Even if there should be a slip during the transmission from the drive device to the at least one tension element which is at least tension-resistant, the drive only consumes a comparatively low power overall, so that it is possible to connect the drive to the useful output of a vehicle battery of a vehicle carrying the substructure so that a separate energy supply is not necessary.

It is expediently provided that the at least one tension element which is tension-resistant is wound several times around the drive device, that is to say around the first rotating body and the second rotating body. In this case, neither the first rotating body nor the second rotating body is completely wrapped, but the wrapping is approximately 180 degrees, so that the rotating body is in each case about half wrapped. The number of wraps is preferably selected between two and eight, more preferably between three and six, but it is particularly favorable to wrap the drive device four times.

The second rotating body is expediently driven by the at least one tension element which is tension-resistant, wherein the first rotating body is set in rotation by the drive. The second rotating body is therefore passive or is dragged by the first rotating body by means of the at least one tension element which is at least tension-resistant.

According to a favorable embodiment, it is provided that the first rotating body has circumferential grooves in which the at least one tension element which is at least tension-resistant is guided. The circumferential grooves and, in particular, the webs delimiting the circumferential grooves ensure that, depending on the drive direction, the at least one tension element which is at least tension-resistant does not migrate axially so that the tension element does not jam on the first rotating body. Circumferential grooves are each arranged in parallel planes in the axial direction of the cylinder and can have inlet slopes for the tension element. It is also possible that the first rotating body has a more or less conical contour, for example that of a truncated cone in which the circumferential grooves have a different circumference. Preferably, however, the circumferential grooves have the same diameter, so that the moment that acts on the at least one tension element which is at least tension-resistant is approximately the same in all grooves. This avoids unnecessary tension on the tension element as a result of different moment loads in the various grooves.

Radial webs are preferably arranged between the adjacent circumferential grooves which prevent the at least one tension element which is at least tension-resistant from leaving the respective circumferential groove. If the drive device is driven, a part of the power transmission can also be transmitted by the rubbing of the at least one tension element which is at least tension-resistant on the corresponding radial web. It is possible to provide a knurling running parallel to the axial direction of the rotating body within the circumferential groove, which increases the force transmission to the at least one tension element which is at least tension-resistant at a point.

The first rotating body and the second rotating body, which are each preferably designed as cylinders, expediently have parallel axes. This makes it possible to adjust the tension of the at least one tension element which is at least tension-resistant favorably by adjusting the axis distance and also to compensate for elongations or shortenings of the tension element, which can occur due to temperature or intensive use. Due to the parallel axes, the force is transmitted particularly favorably to the tension element. Alternatively, however, it is also possible to arrange the axes of the rotating bodies at an angle to one another, for example if the rotating bodies are designed as cones.

The first rotating body and/or the second rotating body preferably have a mutually variable spacing for adjusting the length of the at least one tension element which is at least tension-resistant. This can take place in that the rotating body is received in the region of its axis in an elongated hole which allows an infeed in the direction of the other rotating body. This is expediently provided for the second rotating body, since the first rotating body is driven by the drive and the drive would then also have to be designed to be displaceable. Depending on the set distance, sagging of the at least one tension element which is at least tension-resistant can be prevented, so that there is practically no slip when the drive power is transmitted from the drive to the carriage.

The second rotating body can expediently be displaced in the direction of the first rotating body, so that the tension of the tension element can be adjusted. As an alternative, it is possible to be able to adjust the second rotating body in a direction that does not change the distance from the first rotating body.

According to a favorable development, a spring member is arranged between the first rotating body and the second rotating body, which acts on the second rotating body or its axis in a direction away from the first rotating body or its axis and thus achieves tensioning of the at least one tension element which is at least tension-resistant. In this way, a stable system is advantageously achieved, since the spring member can be tensioned in the event of load peaks as a result of deformations in the area of the top frame or the substructure or in the case of obstacles that have to be overcome, so that a slight equalization of the tension of the tension element within the system results. As soon as the obstacle has been overcome, the second rotating body again assumes the distance from the first rotating body preset on the basis of the spring constant of the spring member and the system of the tension element again has its initial tension. The spring member also dampens the vibrations in a favorable manner through the drive and the movement of the vehicle and of the top frame An advantageous embodiment distinguishes in that at least the second rotating body comprises a plurality of independently rotatable disk-shaped cylinder sections, wherein each disk-shaped cylinder section is wrapped around by the at least one tension element which is at least tension-resistant. As a result, similar to a multiple pulley system, each independently rotatable disk-shaped cylinder section is driven individually by the first rotating body, with the result that the resistance to rotation of the second rotating body is reduced overall. The disk-shaped cylinder sections can be designed in the manner of deflecting rollers as they are used in any case for deflecting the tension element in the area of the substructure. At least two, preferably three, four, five or six disk-shaped cylinder sections are expediently provided, which are arranged coaxially to one another on the axis of the second rotating body. However, it is also possible to mount the cylinder sections on several axes, which, however, entails a more complex mounting.

The transmission of force from the first rotating body to the at least one tension element which is at least tension-resistant is preferably effected by friction, in particular on the circumference of the first rotating body. However, it is also possible to equip the circumference of the rotating body with recesses in the manner of a circumferential toothing and to equip the tension element with projections in the manner of a toothed belt, so that the positive fit in the area of the contact effects the transmission of force.

According to another advantageous embodiment, the grooves and webs can be V-shaped, so that they transport the tension element partially clamped on the circumference, and slippage is practically excluded.

According to a preferred embodiment, it is provided that a locking pin is provided which can be pushed forward against a rotatable part of the first rotating body, that the locking pin secures the first rotating body against rotation and thus blocks the carriage even in a non-driven state of the drive.

According to an aspect of the invention, an openable superstructure for a substructure, such as a self-propelled truck, a truck, a semitrailer, a trailer, a container, a dump truck, a railway wagon, a building or the like is created, comprising a collapsible top frame, a cover which can be connected to the top frame, in particular a tarpaulin, and a drive for folding the top frame in and/or out, wherein the drive causes at least one tension element which is at least tension-resistant to move, wherein the at least one tension element which is at least tension-resistant can be coupled to a distal carriage of the top frame and moves the carriage forwards and/or backwards as a function of an actuation direction of the drive. The superstructure distinguishes in that a locking pin is provided, which can be pushed forward against a rotatable part of the drive, and that the locking pin secures the drive and/or the at least one tension element which is at least tension-resistant against rotation and thus blocks the carriage even when the power of the drive is off. This advantageously means that the drive does not have to be permanently energized in order to hold the fully, partially or not opened top frame, which leads to high power consumption and heat development. In addition, this effectively prevents the permissible power consumption from being exceeded to hold the open top frame in an unfavorable angular position of the substructure or while driving because of the wind that occurs. Finally, the manual locking and unlocking of the openable superstructure outside of the at least one tension element which is at least tension-resistant, is avoided, so that incorrect operation cannot occur. The locking pin ensures that in the de-energized state of the drive, a rotation of the rotatable part of the drive into which the locking pin is advanced, in particular a rotating body such as the first cylinder described above, the carriage cannot be displaced against the bias of the tension element. In this way, the carriage is advantageously not only driven via the tension element, but also locked. A separate mechanical lock that has to be released manually is then no longer required.

The locking pin can expediently be actuated between an advanced position and a retracted position and for this purpose preferably has an electromagnetic drive which can be easily triggered in one and/or the other direction by a control of the drive.

It is possible to provide a circuit or arrangement in which the locking pin is automatically advanced when the actuation of the drive is stopped. Alternatively, the locking pin can also be advanced manually or in some other expedient manner, for example pneumatically or hydraulically.

The locking pin expediently blocks a driven first rotating body, in particular of the drive, and prevents it from rotating, so that forces can be transmitted to the carriage in neither one nor the other direction via the first rotating body. In this way, a locking of the driven rotating body is advantageously achieved, so that the forces that the first rotating body could otherwise introduce into the system including the tension element are effectively prevented. Alternatively, the locking pin can also block another rotating body of the system, for example the aforementioned second rotating body or cylinder or any deflection roller of the system. In this case, however, the top frame may flutter slightly, since the driven rotating body may then attempt to rotate under the tension element.

The locking pin is preferably loaded into the advanced position by a spring element. This advantageously ensures that the locking pin always comes into engagement with the rotatable part when the drive should be de-energized and prevents it from rotating. For this purpose, it is preferably provided that the rotatable part has a recess into which the locking pin can be pushed so that the rotatable part is prevented from further rotation. It is possible to couple the spring element with the locking pin, but preferably the spring element will already be built into an electrically actuatable lifting magnet which then pulls the locking pin back against the bias of the spring element.

The locking pin can preferably be advanced into a frontal recess of the first rotating body, which is preferably provided on the side of the rotating body facing away from a motor. For this purpose, the rotating body expediently comprises a plurality of recesses on its end face into which the locking pin can penetrate, resulting in a correspondingly large number of discrete holding positions. It is possible to provide the recess as a curved elongated hole in order to give the locking pin sufficient opportunity to penetrate into the recess even when the rotatable part is rotated. Appropriately, however, cylindrical bores are provided which are slightly oversized compared to the outer dimension of the locking pin, into which the locking pin can easily engage.

In order to facilitate the penetration of the locking pin into the recess, it is possible to equip it distally with a tip or with a conical or dome-shaped section which favors penetration and centering. In particular, this increases the period of time that is available to penetrate into the recess.

According to a particularly favorable embodiment, the first cylinder has on an end face a disk section with a plurality of holes which are designed such that the locking pin can be advanced into each of the holes. The holes are expediently arranged on a constant radius around the axis of the disk section and, depending on the angle of rotation of the disk section, are aligned with the locking pin. Appropriately, at least eight, preferably more than ten and less than forty holes are provided on the disk section, into which the locking pin can penetrate.

It is possible to provide several locking pins so that they can be advanced at the same time on the rotatable part of the drive, especially when the forces acting on the rotatable part are large and can be better absorbed by several locking pins. In this case, the multiple locking pins engage at the same time. According to an alternative embodiment, the locking pins can also be spaced apart from one another with a pitch that corresponds to the number of locking pins, so that the accuracy of the holding positions of the carriages is improved by a factor that corresponds to the pitch. In this case, however, only one of the locking pins can engage in the rotatable part, while the remaining locking pins press against the disk section, for example, without being able to penetrate the holes.

According to a particularly favorable embodiment, when the locking pin is engaged, the first rotating body is prevented from rotating under the load of the top frame or under the power of the drive. This prevents the drive from consuming a lot of energy in order to compensate for forces acting in the opposite direction. For example, by locking the rotatable part by means of the locking pin, a completely open top frame can be held in this position without supplying energy, even if the substructure, which is designed as a dump truck, is moved to an angular position of 45 degrees or more in order to tip the contents. Forces acting on the closed superstructure such as winds, precipitation such as water or snow, ice sheets, but also misdirected loading with a crane do not lead to a higher power consumption in order to keep the top frame in an open position.

Alternatively, it can be provided that the locking pin can be advanced into a radial recess of the first cylinder. The radial recess can be a hole pattern provided on the circumference of the rotating body with a plurality of holes or recesses, wherein the locking pin then also prevents rotation of the rotating body. However, the disadvantage here is the increased overall height of the rotating body and the required distance from the tension element.

According to another embodiment, it is provided that the locking pin is arranged at the end of a pivotable pawl that is pretensioned in the engagement direction and cooperates with a peripheral toothing of the rotatable part of the drive in such a way that the top frame is prevented from shifting in the closing direction. This pawl can be designed corresponding to the engagement pawl in a parking brake, so that in the driven state it is raised against the bias of a spring, but is does not allow kickback of the carriage.

According to a particularly favorable embodiment, it is provided that, in order to release the locking pin, the drive can only be moved counter to the intended displacement direction, and that the locking pin is thereby at least temporarily relieved so that the locking pin can be pulled back. This configuration of the drive can be easily implemented by appropriate programming of the control, which ensures that the radially loaded locking pin, which otherwise cannot easily be pulled out of a recess or a hole in the rotatable part, can nevertheless be withdrawn. It should be noted that, depending on the position of the substructure, the superstructure and depending on the load on the corresponding parts, the locking pin can absorb relatively large loads, which usually act in the closing direction, but can also act in the opening direction, for example if the substructure rests on an inclined surface. If the drive is only moved in the opposite direction to the intended displacement direction, i.e. in the closing direction if an opening is provided, and if closing is intended in the opening direction, it is ensured that no matter in which direction the locking pin is loaded, it is relieved either in the first counter-rotating movement or during the subsequent main movement for a sufficiently long period of time so that the locking pin can be withdrawn from the corresponding hole. The force that is transmitted to the locking pin via the rotatable body is essentially transmitted via a radial bearing on the locking pin. However, this is so high that it is often not possible to retract the locking pin due to its drive without shifting the tension element back and forth. In this way, it is particularly advantageously possible to dimension the power for the displacement of the locking pin to be small and to allow the locking of the locking pin to act through the mass of the top frame acting on the rotatable part via the tension element.

According to a favorable embodiment it is provided that the locking pin blocks the rotatable part in a form-fitting manner. In addition to the possibilities described above, with which a form-fitting coupling can be achieved, further form-fitting locking possibilities come into consideration.

According to a further advantageous embodiment, the locking pin blocks the rotatable part with a friction fit. This can be done, for example, in that a tip of the locking pin is pressed against a rotatable part equipped with a friction lining. In this case it is necessary to apply a certain frictional force, for example by means of a corresponding spring member. The drive of the locking pin then essentially serves to overcome the force of the spring member. It is possible to combine positive locking and frictional blocking.

The locking pin is expediently electrically actuatable and connected to a control of the drive. As a result, it can advantageously already be advanced when the drive movement has reached its end or only continues to run slightly. In particular, the control can provide for the drive to remain actuated until the locking pin has successfully moved into a blocking position, which can be detected by a corresponding sensor. For this purpose, the drive can be equipped with a creep speed which, due to its lower drive speed, facilitates the possibility of penetrating a recess in the rotatable part. At the same time, the locking pin can expediently be connected to a signal transmitter which, on the one hand, indicates that the convertible top frame is locked and, on the other hand, signals to the control that the drive can be switched off without running the risk of the powerless drive slipping and thus damage to the top frame.

According to an aspect of the invention, a method for opening or closing an openable superstructure for a substructure, such as a self-propelled truck, a truck, a semitrailer, a trailer, a container, a dump truck, a railway wagon, a building or the like is created, comprising a collapsible top frame, a cover that can be connected to the top frame, in particular a tarpaulin, and a drive for folding the top frame in and/or out, wherein the drive causes at least one tension element which is at least tension-resistant to move, wherein the at least one tension-resistant can be coupled to the distal carriage of the top frame and moves the carriage forward and/or backward as a function of an actuation direction of the drive. The method distinguishes by the steps of engaging a locking pin against a rotatable part of the drive when a temporary stop position of the carriage has been reached, in order to block the carriage even when the drive is not driven; and driving the carriage counter to a desired direction of displacement of the carriage before the carriage is driven in the direction of displacement to enable the locking pin to be disengaged and the displacement of the carriage to be released. The method, which is expediently implemented in a corresponding control, makes it possible to automate the drive of the top frame and at the same time to equip it with a low power consumption, since the drive fixes the top frame in its open position even in a powerless state. As a result, the drive can advantageously be operated with a low power, such as is provided, for example, at the useful output of a vehicle battery, so that a separate energy supply for the drive can be dispensed with.

A particularly favorable superstructure distinguishes in that it is prepared for the execution of the method described above, in particular has a control that executes the method. This advantageously ensures that the drive and the locking are carried out by the locking pin in a meaningful sequence that makes it possible to avoid manual unlocking of the locking pin.

According to a particularly favorable development it is provided that the superstructure has a sensor arrangement or is connected to a sensor arrangement of the substructure that detects the inclination of the superstructure and/or the substructure against a horizontal plane and blocks the drive if the inclination exceeds a limit value.

According to an aspect of the invention, an openable superstructure for a substructure, such as a self-propelled truck, a truck, a semitrailer, a trailer, a container, a dump truck, a railway wagon, a building or the like is created, comprising a collapsible top frame, a cover which can be connected to the top frame, in particular a tarpaulin, and a drive for folding the top frame in and/or out, wherein the drive causes at least one tension element which is at least tension-resistant to move, wherein the at least one tension element which is at least tension-resistant can be coupled to a distal carriage of the top frame and moves the carriage forwards and/or backwards as a function of an actuation direction of the drive. The superstructure distinguishes in that a sensor arrangement is provided which detects the inclination of the superstructure and/or the substructure with respect to a horizontal plane and blocks the drive if the inclination exceeds a limit value. This advantageously ensures that the drive is only actuated when the inclination of the substructure does not lead to a power consumption that exceeds the provided energy source or its protection. In particular, if the substructure is arranged with an incline to the horizontal in the direction of the displacement of the carriage, there is a risk that the power consumption when the carriage is shifted uphill, that is, against the slope, is quite high. The sensor arrangement prevents the electrical system from being overloaded or the fuses from melting in such a case, and in particular prevents the necessary displacement work from being able to be performed. This ensures that the body is not operated incorrectly, which could result in the substructure no longer being operational.

The sensor arrangement expediently also detects whether the substructure is being moved, and at the same time prevents the top frame from being actuated while the substructure is in motion. This can also be detected by detecting the forces acting on the top frame, for example from the airstream and other relative speeds.

The sensor arrangement expediently comprises a gyroscope which is designed to determine the inclination. The gyroscope reliably records the inclination values, both in the direction of displacement of the top frame and across it, and provides correspondingly reliable information.

According to another embodiment, it is provided that the sensor arrangement comprises an acceleration sensor which, in addition to the actual inclination, can also detect the movement in the inclination direction. An acceleration sensor is advantageously also suitable for detecting, for example, a tilting movement of a substructure designed as a dump truck.

According to an advantageous embodiment, the limit value of the inclination corresponds to an absolute value of not more than 20 percent, preferably not more than 15 percent and in particular an absolute value of the inclination of not more than 10 percent. The inclination can be in one or the other direction, with the possibility of displacing a top frame in the direction of the slope, even if it can no longer be moved in the direction opposite the slope without exceeding the permissible power consumption.

The drive expediently comprises a control, the sensor arrangement being connected to the control. This advantageously creates the possibility of only triggering the drive when the values detected by the sensor arrangement are within the permissible range.

According to a preferred embodiment, it is provided that data for a maximum power consumption of the drive are stored in the control as a function of the inclination of the substructure, and that functions of the drive can be deactivated when preset maximum values for the power consumption are exceeded. In this way, depending on the angular position or inclination of the superstructure and/or the substructure, some of the functions of the drive can still be provided, wherein the effective forces that lead to increased power consumption are stored in the control as a function of the values of the inclination. It is possible to link the control with a self-learning system that records the actual power consumption and dynamically varies the limit values accordingly.

According to a favorable embodiment, it is provided that when the limit value is exceeded, the carriage is prevented from moving uphill, and that when the limit value is exceeded, the carriage can be moved downhill. It may be the case that, as a result of the above-described counter-rotating initial movement, increased power consumption occurs, but this is limited in time so that the fuse cannot melt.

According to a preferred embodiment, the drive is supplied with energy from a vehicle battery that is fused with 20 amperes. This corresponds to the power that is provided by an output of a vehicle battery for loads such as searchlights and the like.

The sensor arrangement expediently comprises means for detecting the displacement path of the carriages, so that the distance still to be covered can be taken into account when calculating whether the inclination is within the tolerance range or not.

If the substructure is designed as a dump truck, a control of the drive preferably causes the carriage to be shifted into a retracted position before an inadmissible angular position detected by the sensor arrangement, which corresponds to the discharge of the load, is reached. This advantageously ensures that the top frame is opened a little before the dump truck reaches its tipping position, so that the bulk material contained in the dump truck does not load or damage the top frame.

The superstructure preferably comprises a sensor device which comprises a position sensor for the carriage, wherein the drive is stopped when the carriage reaches one of two end positions.

According to an aspect of the invention, an openable superstructure for a substructure, such as a self-propelled truck, a truck, a semitrailer, a trailer, a container, a dump truck, a railway wagon, a building or the like is created, comprising a collapsible top frame, a cover which can be connected to the top frame, in particular a tarpaulin, and a drive for folding the top frame in and/or out, wherein the drive causes at least one tension element which is at least tension-resistant to move, wherein the at least one tension element which is at least tension-resistant can be coupled to a distal carriage of the top frame and moves the carriage forwards and/or backwards as a function of an actuation direction of the drive. The superstructure distinguishes in that a sensor device is provided which comprises a position sensor for the carriage, and that the drive is stopped when the carriage reaches one of two end positions. This advantageously prevents the drive from having to be loaded against an increasing resistance when the end position is reached, in order to detect that the carriage has reached the end position. Rather, the increase in the load when the carriage is displaced can be used to detect an obstacle or a disturbance. At the same time, the position sensor can be used to estimate the travel distance and the associated probable travel time as well as the associated energy consumption in order to determine whether the required power can be provided.

The position sensor can preferably detect the passage of a displacement transducer arranged on the at least one tension element which is at least tension-resistant. The displacement encoder is preferably designed as a magnet, but it can also be another detectable part. The position sensor can also be designed as a field sensor which is able to detect passage of the distal carriage. The displacement encoder is more expediently arranged in the area of the distal carriage, or is part of the distal carriage, so that the position of the distal carriage is decisive for determining the open or closed state of the top frame.

According to another embodiment, the position sensor is designed as an optical sensor, for example a line camera or matrix camera, which either detects the passage of the distal carriage or a displacement transducer connected to it, or determines the opening state of the top frame from the position of the distal carriage on the top frame.

According to an alternative embodiment, it is provided that the position sensor detects a marking on the at least one tension element which is at least tension-resistant. As a result, the position sensor can advantageously also be arranged at a distance from the distal carriage if the markings are also provided at a distance from the distal carriage.

According to an alternative embodiment, it is provided that the sensor device detects the power consumption of the drive, and that the displacement of the carriage towards one of the two end positions is determined as a function of an increasing power consumption of the drive. In this case, the position sensor is designed, for example, as an inductive sensor that can compare the power consumption of the drive with a stored value curve. In this case, the power consumption of the drive for folding up tarpaulin folding aids and the like can also be stored in a memory of the control so that unplanned power consumption can be recorded as representative of a fault condition.

A first threshold value is preferably provided for a power consumption of the drive, which is limited in normal operation, with a power consumption of the drive exceeding the first threshold value being permitted for the duration of a first period of time in order to cope with work peaks According to an aspect of the invention, an openable superstructure for a substructure, such as a self-propelled truck, a truck, a semitrailer, a trailer, a container, a dump truck, a railway wagon, a building or the like is created, comprising a collapsible top frame, a cover that can be connected to the top frame, in particular a tarpaulin, and a drive for folding in and/or unfolding the top frame, wherein the drive causes at least one tension element which is at least tension-resistant to move, wherein the at least one tension element which is at least tension-resistant can be coupled to a distal carriage of the top frame and moves the carriage forwards and/or backwards depending on an actuation direction of the drive. The superstructure distinguishes in that a first threshold value is provided for a power consumption of the drive, which limits the power consumption in normal operation, and that a power consumption of the drive that exceeds the first threshold value is permitted for the duration of a first period of time in order to cope with work peaks. This advantageously ensures that the maximum power consumption usually provided by a vehicle battery and secured by a fuse is not exceeded in continuous operation, so that the battery or the on-board network does not overheat, nor does the fuse strike or blow. The threshold value is expediently selected to be around 15 percent below the secured power consumption, so that random fluctuations in power consumption do not have to be taken into account. Securing the energy supply of the utility output of a vehicle battery is, however, quite slow, so that briefly exceeding the maximum consumption is harmless, provided that the first period is not exceeded. This enables the drive to equip the particularly energy-consuming process of starting up and pushing up the tarpaulin folding aids of the top frame, in which a comparatively large weight force has to be overcome, with increased power consumption, so that overall there is an oscillating power consumption that always has load peaks when the tarpaulin folding aids are pushed up. As a result, the drive system of the top frame can be equipped with a power that repeatedly exceeds the nominal power provided by a useful output of a vehicle battery without triggering its fuse. The first period can be provided several times during the displacement of the superstructure.

The first threshold value for the current consumption expediently corresponds to the rated current of a motor of the drive and is, for example, 10 amperes. If the motor is designed to be stronger, the maximum of the secured power consumption and rated current of the motor is appropriate as the maximum value for the first threshold value. It is possible to select a safety decrease from the secured power consumption for the threshold value, for example 19 amperes, particularly preferably 18 amperes and in a particularly favorable embodiment 17.5 amperes. In this way, a sufficient distance from the secured power of the vehicle battery is maintained, which, however, at the same time enables the opening and closing of the top frame at an appropriate speed. In contrast, the nominal current of the motor does not require a safety decrease for the threshold value. Over a comparatively short period of time, the motor can also be operated with a power consumption that is above the rated current.

The first time period is preferably between 0.0001 seconds (one tenth of a millisecond) and 10 seconds, particularly preferably between 0.001 seconds (one millisecond) and 5 seconds, and very particularly advantageously between 0.01 (10 milliseconds) and 3 seconds. The first period of time is thus long enough that the work of lifting the tarpaulin folding aids can be initiated, especially when the vehicle has a certain incline and/or the tarpaulin is loaded by snow, ice or rain, with the power consumption being reduced again after the work of lifting the tarpaulin has been overcome. In practice, the first period of time is several tenths of a second, about 2 to 8 tenths of a second, so that when the nominal voltage of 24 volts is applied, power consumption can temporarily be increased.

In addition, it is favorably provided that a second threshold value is provided for a power consumption of the drive for the duration of the first period, which limits the power consumption during the first period, for example to the secured amount of a useful output of a vehicle battery, which is, for example, 20 amperes. This ensures that the fuses do not blow, even when dealing with the work peaks. If the first period is selected to be quite short, i.e. less than 8 or, better, less than 3 tenths of a second, the second threshold value for the power consumption of the drive can be selected to be even higher than the protected power consumption, as the inertia of the fuse allows this. With a secured power consumption of 20 amperes and a rated current of the motor of also 20 amperes, the second threshold value can be set to 30 amperes in order to provide increased power.

It is possible to provide a minimum time interval that lies between successive first periods of time, for example to ensure that the system does not overheat or that the fuse is activated despite its inertia. The interval is expediently the duration of the first period, preferably double the duration of the first period and particularly advantageously at least five times the first period. The interval and the first period of time are thus roughly matched in relation to the distances of the carriage, so that the travel speed of the carriage for performing the work of opening or closing the top frame is constant, at least in a first approximation, and for the outside observer there is a more uniform, low-jerk and harmonious movement.

It is possible to record the power consumption of the displacement of the carriages for opening and closing the convertible top frame while driving and to adapt the driving speed as a function of whether the parameters threshold value and first period are reached.

The power consumption of the drive is expediently oscillating, so that there is a high power consumption in the area of pushing the tarpaulin folding aids or overcoming resistances such as deformation of the substructure, damage to the guide and so on, and low power consumption for the rest of the displacement of the carriage.

The drive is expediently supplied electrically by an energy source of a vehicle transporting the substructure, for example the vehicle battery or its useful output. As a result, it is not necessary to equip the substructure or the superstructure with its own battery or power supply, so that there is no need to charge or maintain this energy source.

According to a preferred development of the superstructure, it is provided that the control of the vehicle controls the drive of the superstructure.

According to a preferred embodiment, the maximum power consumption of the drive is achieved when a tarpaulin folding aid is raised. However, it is also possible that the maximum power consumption is reached when starting up, when overcoming an obstacle or when compensating for the deformation of a substructure.

The maximum power consumption of the displacement movement of the superstructure depends on a number of parameters, including the inclination of the superstructure or the substructure relative to the horizontal. A displacement against a gradient is associated with a higher power consumption than a displacement in the direction of the gradient. A sensor arrangement is therefore expediently provided which detects the inclination of the superstructure or the substructure, and the control includes means which determine the expected power consumption as a function of the inclination of the vehicle. In this case, depending on the inclination and depending on the power consumption in the uninclined state, the drive of the top frame can be blocked if the inclination exceeds a critical threshold value.

According to an aspect of the invention, a method for opening and closing a superstructure for a substructure, such as a self-propelled motor vehicle, a truck, a semitrailer, a trailer, a container, a dump truck, a building or the like, is created, comprising a collapsible top frame, a cover that can be connected to the top frame, in particular a tarpaulin, and a drive for folding in and/or unfolding the top frame, wherein the drive causes at least one tension element which is at least tension-resistant to move, wherein the at least one tension element which is at least tension-resistant can be coupled with a distal carriage of the top frame and moves the carriage forwards and/or backwards depending on an actuation direction of the drive. The method distinguishes by the steps of driving the carriage with a power which is below a first threshold value for a current consumption of the drive in order to displace the carriage, and driving the carriage for the duration of a first period with a power which lies above the first threshold value for a power consumption of the drive in order to displace the carriage when a work peak required by pushing open the cover is required. The method expediently makes it possible to provide power peaks for the superstructure despite a comparatively low level of protection against electrical power.

According to an aspect of the invention, a superstructure is provided which comprises a control which is adapted to carry out the method described above. The control is designed in such a way that the superstructure does not need its own energy source to open and close the top frame, but can access existing energy sources or their useful output.

An expedient embodiment of the superstructure distinguishes in that a camera is provided which scans the interior of at least the substructure. In this way it is advantageously possible to determine whether the substructure is filled or not and whether bulk material or impurities are possibly provided in the area of the displacement of the carriage.

Another favorable development of the superstructure results from the fact that a worklight is provided which illuminates the interior of at least the substructure. The worklight can be supplied via the same energy supply as the drive and makes it possible, for example, to provide the lighting required for loading the substructure.

The worklight is expediently switched off when the drive is driven by a motor in order to avoid exceeding the limits of the power consumption of the energy supply.

According to a favorable embodiment it is provided that a control panel is arranged on the substructure or on the superstructure, which control panel is connected to a control of the drive. The control panel is expediently equipped with a plurality of control buttons and several displays with which the drive can be operated. A control button can be used to open the drive. Another control button can be used to close the top frame. Displays can, for example, indicate malfunctions or permissible or impermissible inclinations, and control buttons for the light or the camera can also be provided. It is also possible to provide a display in the control panel that shows the images captured by the camera.

According to a further advantageous implementation, it is provided that the drive comprises a control which has an interface with a hotspot, in particular a WiFi or Bluetooth hotspot, via which an operating device connected to the hotspot, such as a smartphone or a tablet computer can be used to operate the drive. As a result, it is not necessary for an operator to enter the inputs directly on the control panel, but this can be done via the external control unit. For example, the driver of a semi-trailer truck can remotely control the superstructure of the trailer using a tablet PC or his smartphone, and at the same time he can see the camera image on the display of his control unit.

In addition, the control panel can also be arranged in the driver's cab of a corresponding truck.

The possibility of using an external operating device makes it possible, in particular, to use self-propelled trucks in which no driver can operate the substructure or the superstructure. In this case, it is sufficient if a person equipped with an operating device at the destination identifies himself as an authorized operator via the hotspot and gives the appropriate commands. This can also be done automatically by a computer.

In the case of a favorable design of the substructure as a dump truck, the carriage is advantageously retracted when it reaches an angular setting detected by the sensor arrangement, which corresponds to pouring the load, so that the load cannot damage the top frame and in particular the tarpaulin. In this case, the displacement or retraction of the carriage can already be initiated before the dump truck has reached its final angular position.

It is preferably provided that further carriages on one side of the top frame are free from the at least one tension element which is at least tension-resistant. This makes it possible for the carriages to move freely on a guide of the top frame and for only the distal carriage to be coupled to the tension element by a corresponding device. Alternatively, the distal carriage can be carried along by a slider connected to the tension element, which only acts on the distal carriage in one direction, so that the carriage is opened against the restoring force of the mass of the top frame by the drive, while it is closed under the load of the mass without drive.

The at least one tension element which is at least tension-resistant expediently runs in sections parallel to a guide rail for the carriage. This enables it to be coupled to the distal carriage in a simple manner.

The at least one tension element which is at least tension-resistant is expediently designed as an endless, closed tension element so that the drive can move it in both directions. The tension element can optionally drive the distal carriage on one side of the top frame or both distal carriages on both sides of the top frame.

Expediently, the at least one tension element which is at least tension-resistant is designed as a metallic wire, in particular made of steel, which is not very flexible, only slightly lengthened or shortened with temperature fluctuations, and which is very robust against external interference.

The ends of the at least one tension element which is at least tension-resistant are preferably connected to one another with a clamp in order to achieve an endlessly revolving tension element, wherein the clamp advantageously simultaneously causes the connection to a distal carriage of the top frame. If several carriages are driven by the tension element, a second clamp can easily be connected to the tension element.

In a preferred embodiment, it is provided that the at least one tension element which is at least tension-resistant is connected to two distal carriages that are connected to a common strut, and that the tension element drives the two distal carriages at the same time. For this it is not necessary to provide two tension elements, rather the drive enables the two carriages to be driven simultaneously. If the top frame has a sufficiently rigid end carriage, this enables the distal carriage to be driven from only one side, so that there is then no need to drive two distal carriages at the same time.

According to a preferred embodiment, it is provided that the at least one tension element which is at least tension-resistant, is connected to a distal carriage, which is connected to a strut, and drives the collapsible top frame on one side. It is also possible that the distal carriage is not connected to a strut, for example when the tarpaulin folding aid has a lifting strut, in this case the at least one tension element which is at least tension-resistant is connected to a distal carriage and drives the collapsible top frame on one side.

Expediently, the at least one tension element which is at least tension-resistant fixes the connected carriage or carriages in their position when the rotatable part is blocked in a rotational angle position. As a result, it is not necessary to provide a manually releasable lock.

The drive preferably comprises a 24 volt motor, which is easily available as a standard product on the market and also does not require a large amount of installation space.

Alternatively, the drive can include an attachment for a hand crank, so that the hand crank can also be used to open and close the top frame in place of the mounting of an electric motor.

According to a first preferred embodiment, it is provided that the superstructure delimits an upper roof opening of the substructure in a closable manner. In this case, the cover is, for example, a roof tarpaulin that is to be opened or closed for loading and/or unloading.

In an alternative embodiment it is provided that the superstructure delimits a lateral roof opening of the substructure in a closable manner, for example a lateral loading opening of a curtainsider. In this case, the cover is designed, for example, as a side tarpaulin of the substructure.

The cover is expediently designed as a foldable tarpaulin, but it is also possible to form the cover from a plurality of articulated foldable plate bodies that span a foldable hard roof. However, the power consumption of the drive for folding panel bodies is significantly higher than that of a tarpaulin, since not only are the moving masses higher, but the lack of flexibility of the panel bodies also inhibits the kinematics.

The top frame can also be designed so that it can be opened in both directions, in that not only the distal carriage can be driven to make the top frame come out, but also a proximal carriage. In this case, the connection of the at least one tension element which is at least tension-resistant to the carriage is to be designed in such a way that the connection only entrains the carriage in one direction and not also in the other. As a result, the tension element can then be used in both directions to drive one and/or the other carriage.

According to a preferred embodiment it is provided that the at least one tension element which is at least tension-resistant is directly connected to the carriage so that the power of the drive can be transmitted to the distal carriage via the tension element with few interposed elements. Alternatively, it is possible to equip the carriage with a connecting part that protrudes downward from the carriage, for example, and that extends into the displacement area of the tension element so that it is not necessary to attach the tension element to the substructure or guide directly at the height of the carriage. In a favorable embodiment, it is also provided that the tension element which is tension-resistant is coupled to a lever which is pivotably connected to the carriage. The lever is advantageously an extension of a part which is already attached to the distal carriage, for example a distal cover which is arranged pivotably about the axis of the lever. But it is also possible to articulate the lever on the distal carriage independently of this.

The at least one tension element which is at least tension-resistant expediently comprises a first deflecting device around which the tension element is placed, which is expediently a distal deflecting roller that can be arranged in the region of the distal carriage when the top frame is closed. The first deflection device is expediently rotatable about a horizontal axis and attached directly or indirectly to the substructure, so that the tension element can move endlessly over the first deflection device in the manner of an upper run or a lower run.

Preferably, the at least one tension element which is at least tension-resistant, is placed further around a second deflection device, which is preferably designed as a deflection roller, which can be rotated about a vertical axis, for example in the region of a section extending the substructure, with which it is possible to deflect the tension element in one direction which is at least approximately perpendicular to the extension of the tension element between the second deflection device and the first deflection device. In this way, one longitudinal side of the substructure can also be actuated favorably by the same tension element as the second longitudinal side of the substructure.

Preferably, the at least one tension element which is at least tension-resistant is also placed around a third deflection device, which is preferably a deflection roller that is rotatably connected about a substantially vertical axis to a region continuing the substructure, so that both the upper run and the lower run, which come from the first deflection device, are coupled with the rotating body driving the tension element. The coupling can take place in such a way that the tension element is coupled to a first rotating body driven by a motor, wherein the tension element is wound several times around the first rotating body. If the top frame is driven from two sides, the tension element of one is connected from the second deflecting device and the third deflecting device to an opposite deflecting device, and the part of the tension element reaching back is then connected to the driving first rotating body of the drive. It has to be understood that the drive can be designed as described in detail above.

Further advantages, features, properties, and developments of the invention result from the dependent claims and from the following description of a preferred embodiment.

The invention is explained below with reference to the accompanying drawings using a preferred embodiment.

Figure 1:
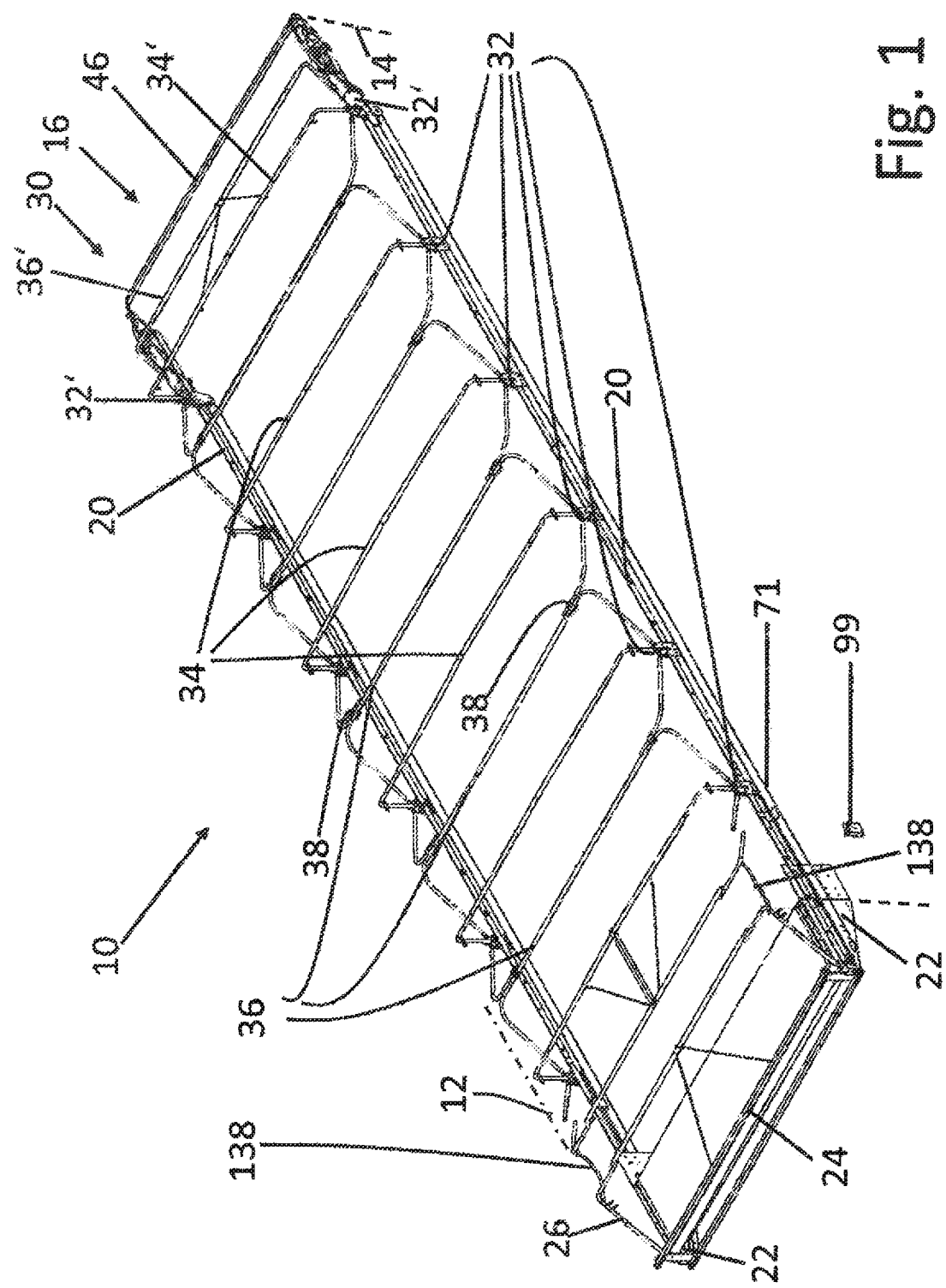
FIG. 1 shows a perspective view of a preferred embodiment of an openable superstructure designed as a tarpaulin superstructure.
Figure 2:
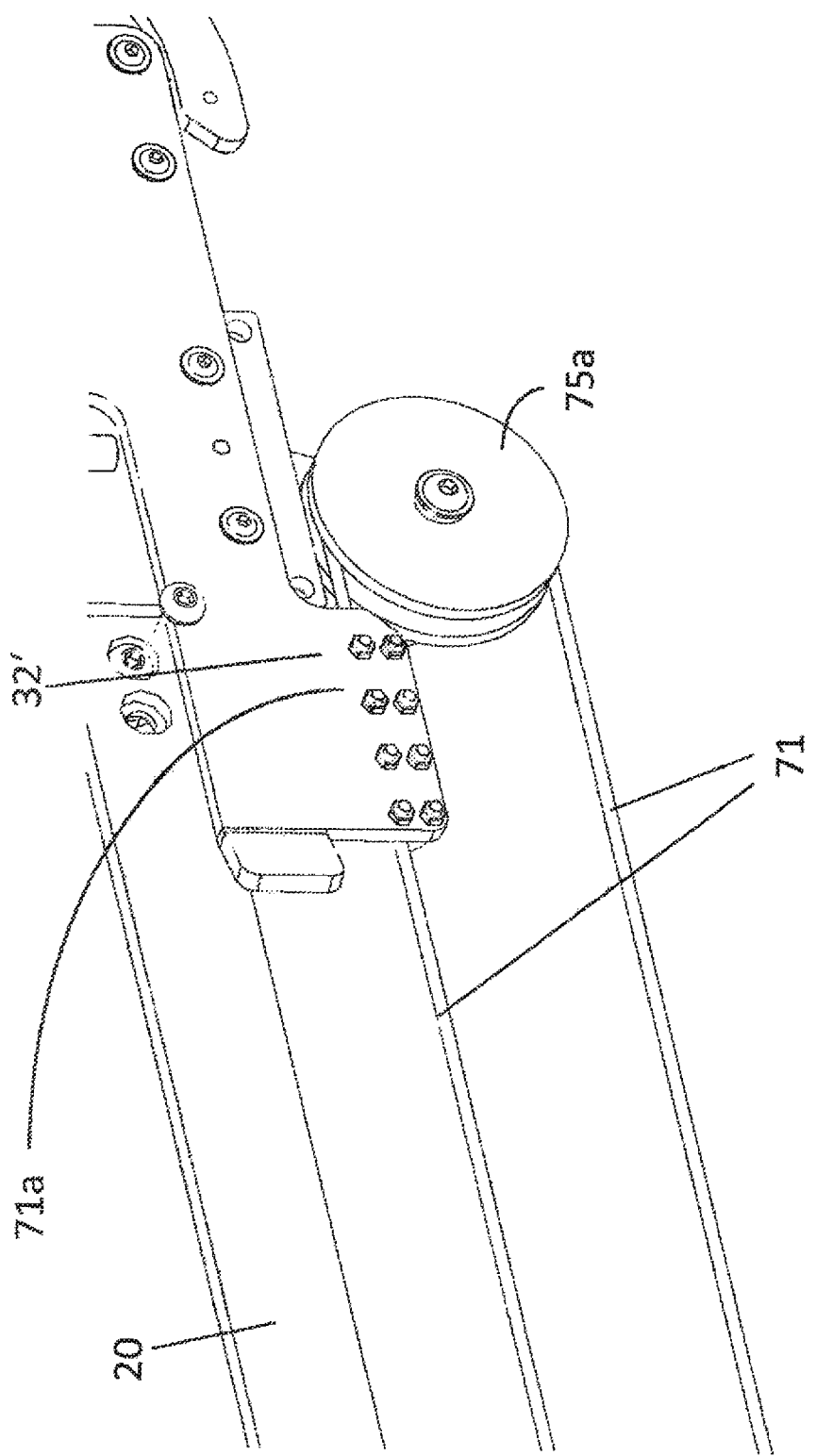
FIG. 2 shows a side perspective view of a region of the distal carriage of the superstructure from FIG. 1.
Figure 3:
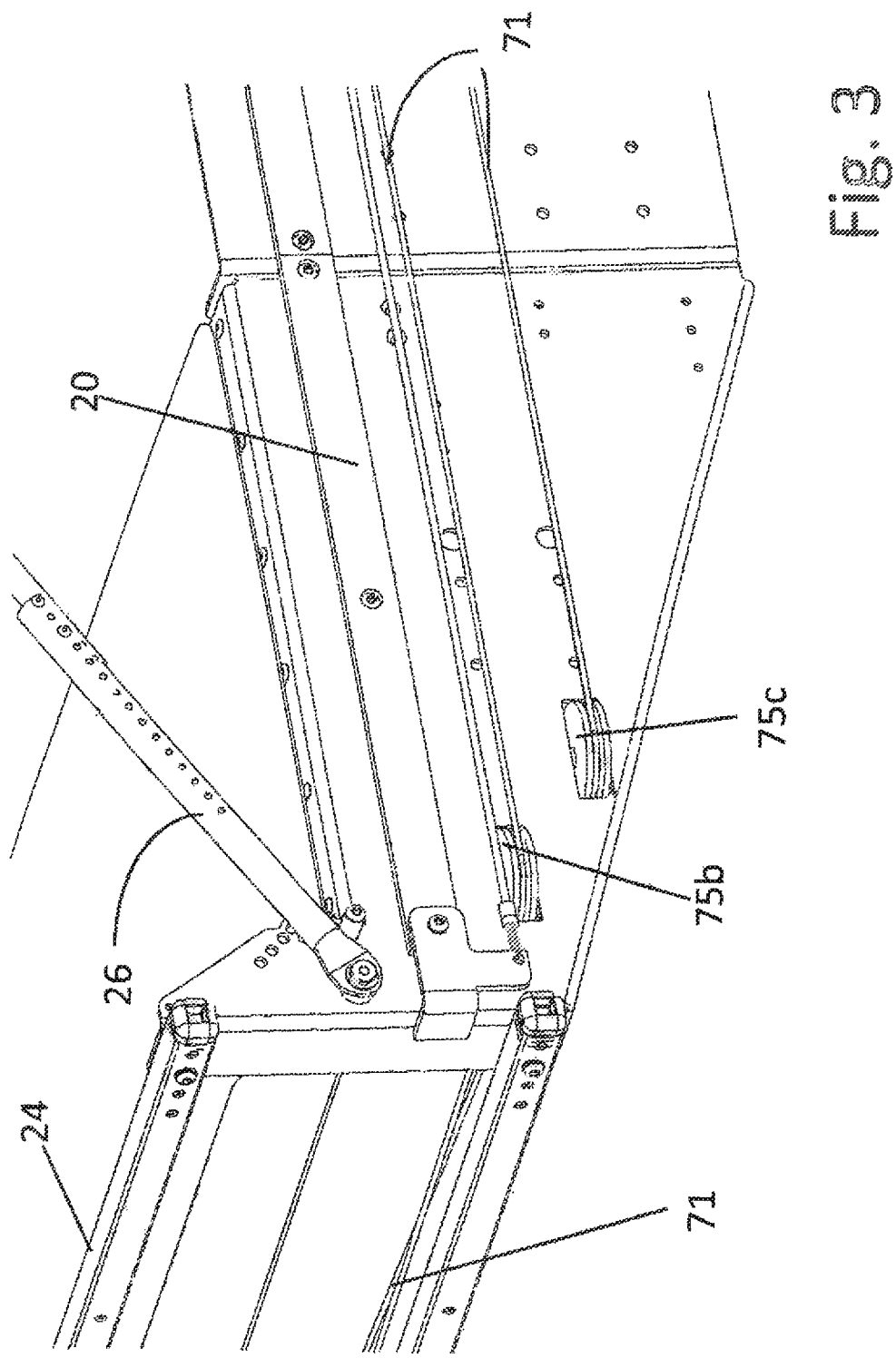
FIG. 3 shows a perspective view of a rear region of the superstructure from FIG. 1 from the side.

FIG. 1 shows a perspective view of an openable superstructure designed as a tarpaulin superstructure 10, in which a tarpaulin 12 shown in dash-dotted lines is indicated, which is not shown in the other figures for better illustration. Furthermore, the part of a silhouette of a container 14 is indicated by dashed lines, which is covered by a top frame 16. The container 14 is designed, for example, as a debris trough in which scree, but also dusty materials can be received, which is why the cover by the tarpaulin superstructure 10 is expedient, possibly even prescribed when transporting on a truck. A front end wall of the container 14 is designed as a dump truck flap which is connected to the container 14 via a swivel joint and which enables the container to be emptied by tilting it.

The tarpaulin superstructure 10 has on both sides of the container 14 on its lateral outer wall in each case a connected guide rail 20, which consists of a plurality of guide rail sections which are fixed at a distance from the container outer wall, for example by rivets, screws or other suitable fastening means that allow a defined distance to the outer wall of the container 14. As a result, the guide rail 20 is formed as a continuous part, composed of several parts, with a rectangular profile, which in the installed state has the upper and lower sides as narrow sides and the broad sides parallel to the container wall.

At the rear end of the top frame 16 in the opening direction, which is shown on the left in FIG. 1, the top frame 16 projects beyond the end of the container 14, wherein a substantially triangular bracket or plate 22 is connected on the rear of the container 14 as an extension of the outer wall of the container 14, at which the guide rail 20 continues. The purpose of the protruding area is to be able to completely release the entire filling opening of the container 14 in the open state, in that the movable parts of the top frame 16, which are still to be described, can be displaced there. In particular, no parts of the tarpaulin superstructure 10 should hinder the filling of the container 14. The triangular plate 22 extends higher than the plane of the guide rail 20 and extends the lateral outer wall of the container 14 to the rear at this height. In practice, the sides of a container are often referred to according to the direction in which it is moved, with the flap usually located on the rear of the vehicle; in the present case, however, the region in which the movable parts of the top frame 16 collect when the tarpaulin superstructure 10 is open is referred to as the rear end, and the front end is the one that is first released from a closed tarpaulin superstructure 10.

Furthermore, an end stop 24 spanning the width of the container is provided, which lies essentially in a plane perpendicular to the guide rails 20 and has an inverted U-shape, and is connected with the ends of the U to the triangular plates 22 at their ends.

The top frame 16 also has a sliding top arrangement 30 which is movable along the guide rails 20 and which can be opened to release the loading opening of the container 14 and can also be closed again to cover it.

The sliding roof arrangement 30 comprises a plurality of carriages 32 which can be displaced along the guide rail 20. Each carriage 32 opposite to a longitudinal bisector, that is the plane which is arranged centrally between the side walls of the container 14 or the plane which runs centrally and parallel to the guide rails 20, is connected to one another via a U-shaped strut 34, the strut 34 having two curved corner pieces and optionally an elongated connecting piece made of a round tube, which are plugged together, whereby a favorable standardization of the parts is achieved. All the struts 34 provided on the carriage 32 are at the same height, which corresponds approximately to the height of the tarpaulin 12 when the tarpaulin superstructure 10 is closed. For this purpose, the tarpaulin 12 is connected to the struts 34 via suitable connecting means, for example by means of buckles or belts or receptacles formed in the tarpaulin 12. The number of carriages 32 and thus the struts 34 can vary depending on the length of the tarpaulin superstructure 10.

A swivel bow 36 is also pivotably articulated on each carriage 32 on both sides of the strut 34 via a joint, which is also plugged together from a cylindrical tube via an angle piece and an elongated connecting piece. A swivel bow 26 is also articulated to the end stop 24 at the level of the carriage 32, but cannot be displaced along the guide rails 20. Overall, it is possible to arrange the swivel bows 26, 36 further up in relation to the carriage, that is to say on the legs of the struts 34 formed by the corner pieces. In the case of tarpaulin superstructures that only build over a loading platform, for example, bows that are connected at a medium height of the struts are sufficient. The swivel bows 26, 36 protrude at a flat angle of approximately 30° to the horizontal and enclose an angle of approximately 60° with the associated strut 34 or the end stop 24. The swivel bows 26, 36 can each be swiveled up into an angular position of approximately 90° to the horizontal, in which they run practically parallel to the respective struts 34 or end stop 24.

On the foremost pair of carriages 32', which are connected to one another by a strut 34' that is more stable than the other struts 34, a cover bow 46 is connected in a hinge on the side facing away from the rest of the convertible top frame 16, which is pivotable between a downward pivoted, essentially horizontal position, so about 0° inclination to the horizontal, and a vertical position, so about 135° inclination to the horizontal. The pivoting movement of the cover bow 46 tensions the tarpaulin 12. It can be seen that the cover bow 46 in turn comprises two (multiply) curved bow sections and an elongated connecting piece, which are connected to a frame section of the foremost carriage 32' at a distance from the strut 34'. Between the articulation of the cover bow 46 and the strut 34', an auxiliary bow 36' is articulated in a hinge, which protrudes at an angle of approximately 45° to the horizontal.

A special feature of a tarpaulin superstructure 10 for a container 14 is that the container 14 has a high degree of rigidity, so that the top frame 16 must follow the changes in shape of the container. These can be caused by thermal expansion, for example when the container is hot, or deformation of the container, for example by the mass of the filling or by mechanical damage. Therefore, a feature of the top frame is that the U-shaped struts 34, swivel bows 36 and cover bow 46 allow a certain resilient deformation in the Y direction, that is the horizontal axis transverse to the displacement direction (X axis). In this way, the roof frame 16 can compensate for tolerances of up to 50 mm without the movement of the carriages 32, 32' being permanently impeded. Since the manipulation of the container 14 can sometimes lead to damage to the guide rail 20, it is advantageously composed of parts that can be loosened and exchanged or straightened as required. The angles given above also designate the angle of the plane in which the bow lies to the horizontal—the pivot axis of the joints is in the Y direction.

Bows 36, facing one another, of adjacent carriages 32, 32' are connected to one another in the region of the angle pieces 36*a* via two pivot angle limiters 38. The bow 26 articulated to the end stop 24 and the rearmost bow 36 are connected to one another via link kinematics 138 designed as a knee joint.

Both carriages 32' connected to the foremost strut 34' can be driven by an electric drive 70 to displace the sliding roof arrangement 30 along the guide rail 20. The drive 70 comprises a tension element 71 which is tension-resistant designed as an endless wire, that is to say closed, and is coupled to the foremost carriage 32' via a clamping arrangement 71*a*, so that the movement of the wire 71 displaces the foremost or distal carriage 32'. The drive 70 further comprises a 24 volt electric motor 72, the output shaft 72*a* of which is coupled to a worm 72*b* which meshes with an input shaft 73*a* of a first rotating body designed as a first cylinder 73. It is possible for a slip clutch to be arranged between the motor 72 and the first cylinder 73 in order to decouple the parts in the event of a mechanical overload. It is also possible to provide a gear or other connections between motor 72 and input shaft 73*a*.

A housing 22*a* is connected to one of the two triangular plates 22 of the substructure or container 14, in which the first cylinder 73 and a second rotating body designed as a second cylinder 74 are accommodated. The first cylinder 73 and the second cylinder 74 are each rotatably connected to the housing 22*a*. Here, the first cylinder 73 is fixedly mounted in the housing 22*a*, while an axis 740 of the second cylinder 74 is housed in an elongated hole 220 of the housing 22*a*, which elongated hole 220 in its main axis points to the first cylinder 73, so that the second cylinder 74 accordingly is adjustable in its distance from the first cylinder 73 or its axis 730. The first cylinder 73 and the second cylinder 74 together form a drive device 75 for the tension element 71, which is placed around the two cylinders 73, 74 several times. In this case, the tension element 71 is not completely wrapped around one of the cylinders, but is always alternating at approximately 180 degrees around each of the two cylinders 73, 74.

The first cylinder 73 has a plurality of circumferential grooves 73b which run normal to the axis 730 of the first cylinder 73 and in which the tension element 71 is guided. The circumferential grooves 73b have a slightly V-shaped contour which guides the tension element 71 in a slightly clamping manner. Radial webs 73c, which prevent the tension element 71 from leaving the respective circumferential groove 73b, are arranged between adjacent grooves 73b. It can be seen in particular in FIG. 8 that a total of five circumferential grooves 73b are formed on the first cylinder 73.

The second cylinder 74 comprises four rotatable disk-shaped cylinder sections 174 which can rotate about the axis 740 independently of one another. The cylinder sections 174 are designed in the manner of a package of deflection rollers. The cylinder sections 174 each have a circumferential groove 174b for guiding the tension element 71, which can also be V-shaped, but which in the present case is designed as a stepped recess between two coil disk areas.

In order to reliably introduce a force from the motor 72 into the tension element 71, the first cylinder 73 and the second cylinder 74 form a drive device 75 in that the tension element 71 wraps around a first, uppermost groove 73b of the cylinder 73 at approx. 180°, then a first, uppermost cylinder section 174 of the second cylinder 74 in the region of its groove 174b wraps around approx. 180° and then again the second, second uppermost groove 73b of the cylinder 73 at approx. 180°. This is repeated for all further grooves 73b and cylinder sections 174 with grooves 174b until the tension element 71 leaves the fifth, lowermost groove 73b. As a result, a tensile force is reliably introduced into the tension element 71. At the same time, it is avoided that the tension element 71 jams around a single cylinder as a result of the drive movement. At the same time it is ensured that the spacing of the tension element 71 on the two cylinders 73, 74 prevents the tension element 71 from self-locking.

Figure 10:
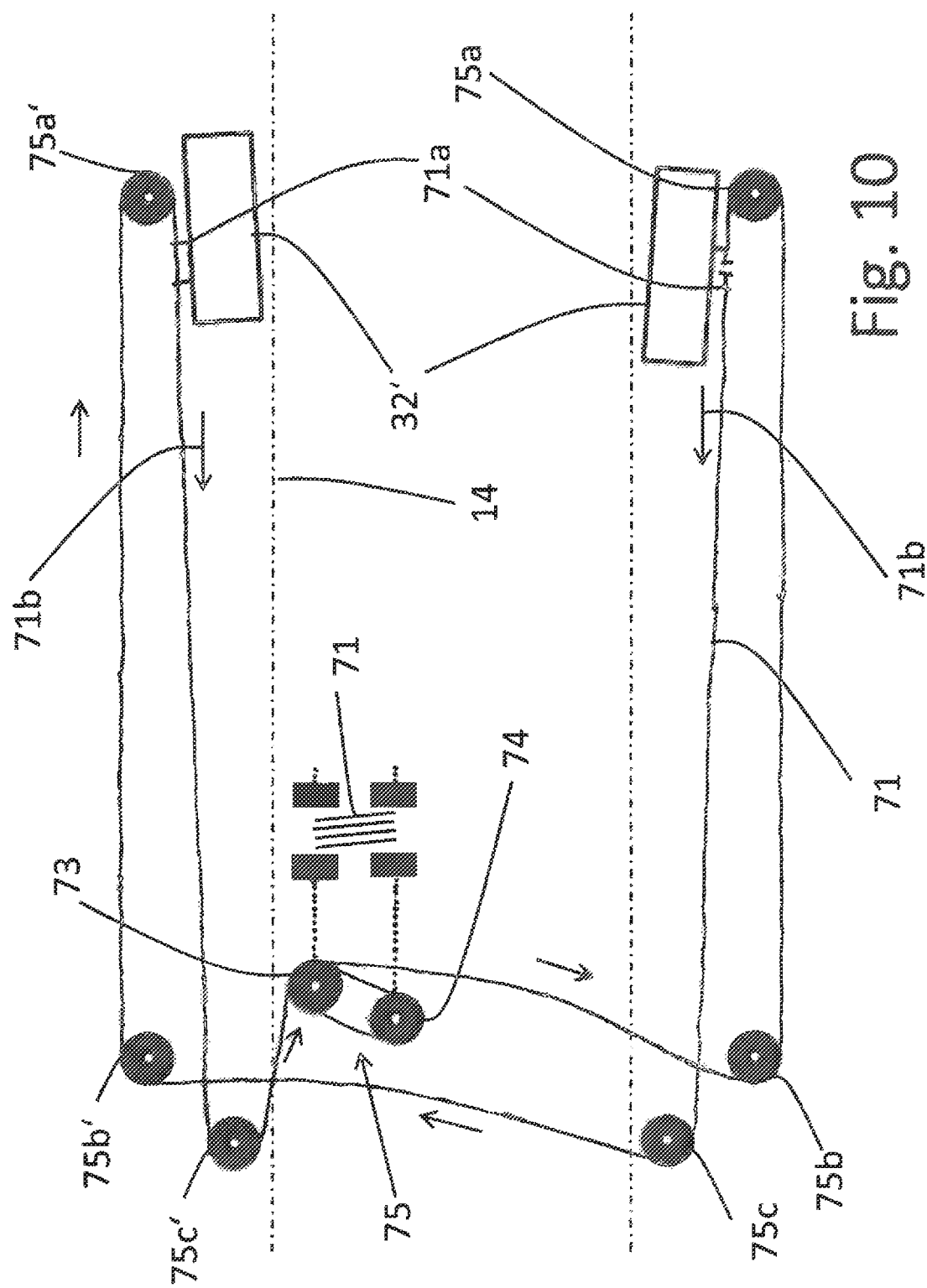
FIG. 10 shows a schematic representation of the guide of the tension element from FIG. 1 to 9.

In FIG. 10 is shown schematically how the tension element 71 is laid. The tension element 71 is connected to the distal carriage 32' in the region of a connection 71a and entrains in the direction of the arrow 71b to open the tarpaulin superstructure 10 or in the opposite direction to close the tarpaulin superstructure 10. The tension element 71 is placed around a distal deflection roller 75a, 75a', wherein the two sections extending from the deflection roller 75a are deflected around deflection rollers 75b, 75b', 75c, 75c'.

The distal deflection roller 75a, 75a' can be rotated about a horizontal axis, so that the tension element 71 runs essentially parallel to the guide rail 20, as can also be seen in FIG. 1. The further deflection rollers 75b, 75b', 75c, 75c' are each connected to one of the two triangular plates 22 about vertical axes. The tension element 71 is guided from the deflection roller 75c on one side to the deflection roller 75b' on the other side, so that the same tension element 71 drives the two distal carriages 32'. The tension element 71 is guided from the other proximal deflection roller 75c to an uppermost groove 73b of the first cylinder 73 of the drive device 75. From the drive device 75 wrapped around several times above, the tension element 71 then passes to the further deflection roller 75c'.

Figure 8:
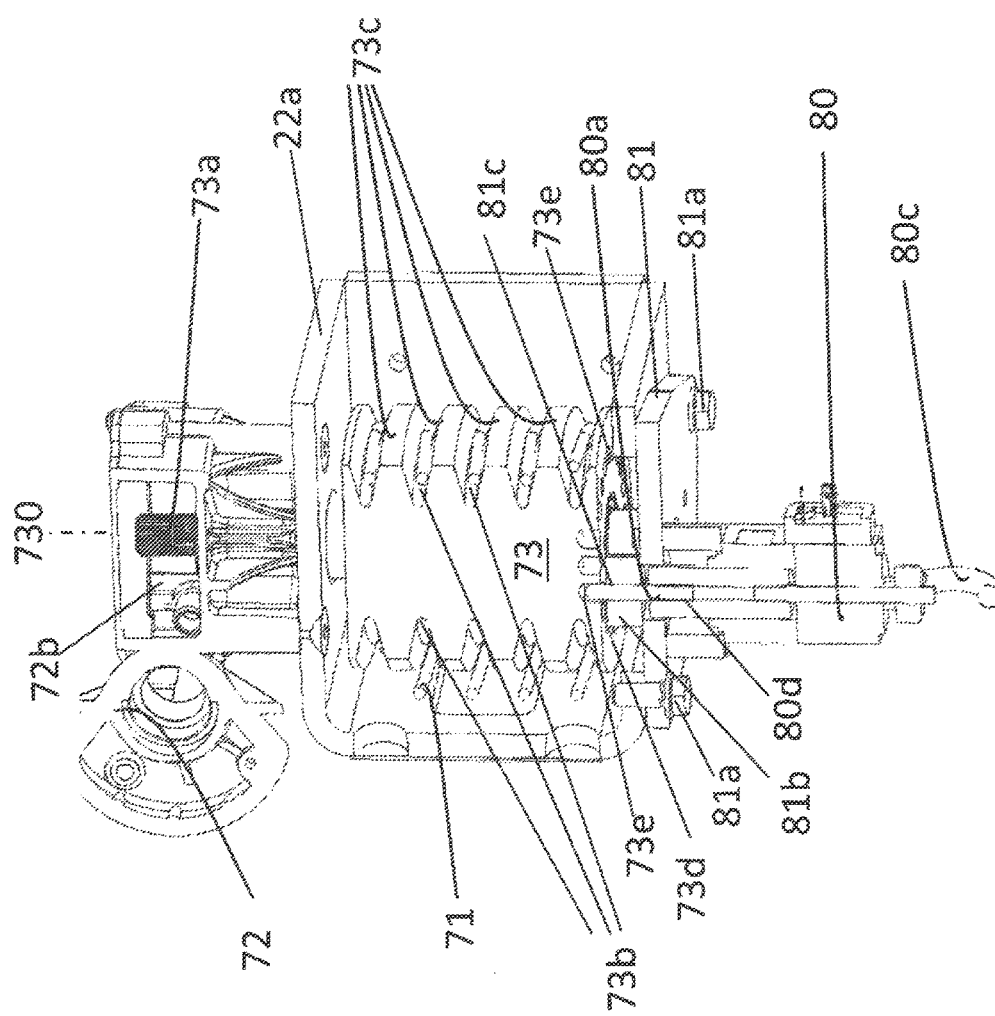
FIG. 8 shows a longitudinal section through the drive device.

It can be seen in FIG. 8 that a lower end face 73d of the first cylinder 73 has a ring with a plurality of cylindrical holes 73e which are arranged in a fixed radius around the axis 730 of the first cylinder 73. A support plate 81 is connected to the housing part 22a enclosing the first cylinder 73 by means of screws 81a, on which an electromagnetically actuatable lifting magnet 80 is arranged, the lifting armature of which is coupled to a locking pin 80a, the distal end of which points towards the first cylinder 73. On the side facing the first cylinder, the support plate 81 has a plate 81b with a cylindrical bore 81c through which the locking pin 80a can be displaced. The cylindrical bore 81c supports the locking pin 80a when it is exposed to radial forces against kinking or bending. The locking pin 80a is equipped at its proximal end with an external thread which is screwed into an internal thread 80c of the lifting armature 80.

The locking pin 80a can be advanced against the end face 73d of the first cylinder 73 which forms a rotatable part of the drive 70, so that when the locking pin 80a penetrates into one of the holes 73e, the locking pin 80a secures the drive or the at least one tension element 71 against rotation and thus blocks the distal carriage 32'.

The lifting magnet 80 enables the locking pin 80 to be actuated between an advanced position and a retracted position, so that the drive 70 can be released or blocked depending on the activation of the lifting magnet 80. By energizing the lifting magnet 80, the locking pin 80a is withdrawn against the advanced position, while a spring element already installed in the lifting magnet acts on the locking pin 80a in the direction of the advanced position. If the first cylinder 73 is rotated sufficiently slowly, the locking pin 80a can penetrate into the hole 73e opposite the locking pin 80a and lock the first cylinder 73 under the load of the spring element when the lifting magnet 80 is not energized. It is therefore provided that the lifting magnet is energized while the drive 70 is actuated. For this purpose, the drive 70 and the lifting magnet 80 are both connected to a control 99 of the drive 70.

It is of particular importance here that the circumference of the hole 73e then rests radially on the outer circumference of the locking pin 80a, which protrudes into the hole 73e, wherein the entire load of the top frame due to the connection with the tension element 71 and its friction and/or clamping force transmission to the first cylinder 73 bears on the locking pin 80a via the hole 73e. This load is not insignificant since, in addition to the actual mass of the top frame 32, the spring force stored in the tarpaulin 12 can act in one or the other direction of displacement of the carriages 32', and in the case of the design of the substructure 14 as a dump truck, the gravity loading the top frame can be added.

Against this background, due to the force acting radially on the locking pin 80a, it is often not possible to withdraw the locking pin 80a from the corresponding hole 73e with the lifting magnet 80 against the load of the spring element of the lifting magnet 80.

For this reason, a control 99 of the drive 70 is designed in such a way that in case of an operator command to move the foremost carriages in a certain direction, a short travel path or a short travel pulse in the opposite direction is initially initiated, which, if the circumference of the locking pin 80a is loaded leads to its relief, so that the lifting magnet 80 can move the locking pin 80a out of engagement with the first cylinder 73. If, on the other hand, the load is in the opposite direction, the subsequent actual displacement movement of the drive 70 leads to the locking pin 80a being released, with the result that the lifting magnet 80 can then retract the locking pin 80a.

The method described above for controlling the opening or closing movement of the openable superstructure 10 or of the superstructure 10 capable of being opened is stored as a program in the control 99, for example.

The locking pin 80a is equipped with a pulling end 80c which protrudes from the end of the lifting magnet 80 facing away from the first cylinder 73 and is designed as a ring, which also enables the locking pin 80a to be unlocked manually. In this way, the opening of the body 10 can be released even in the event of a fault in the electrical system.

It can be seen that the locking pin 80a blocks the rotatable first cylinder 73 in a form-fitting manner and in particular prevents the drive 80 from causing the first cylinder 73 to move relative to the tension element 71. Blocking the first cylinder 73 is therefore the preferred option of blocking the tension element 71 at the same time and preventing a movement in the system of the drive 70 and the deflection rollers 75a, 75b, 75c from occurring.

The lifting magnet 80 can expediently be actuated by applying an electrical voltage and is connected to a control of the drive so that the movement of the drive 70 and the displacement work of the lifting magnet 80 can be coordinated with one another. At the same time, both parts are equipped with a signal transmitter which informs the control whether the locking pin 80a of the lifting magnet 80 is engaged in the first cylinder 73 or not.

Figure 4:
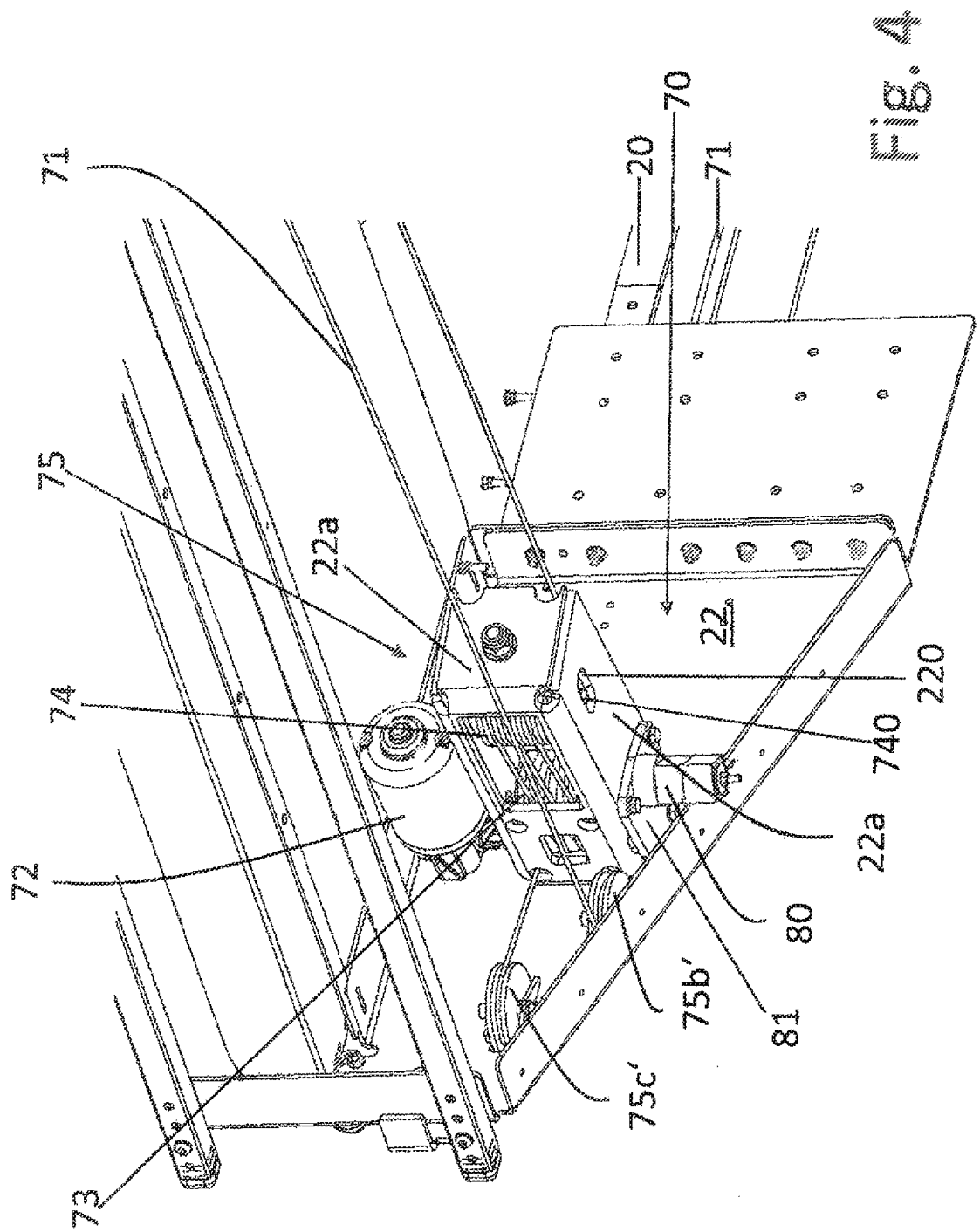
FIG. 4 shows a perspective view of a rear region of the superstructure from FIG. 1 from the rear.
Figure 5:
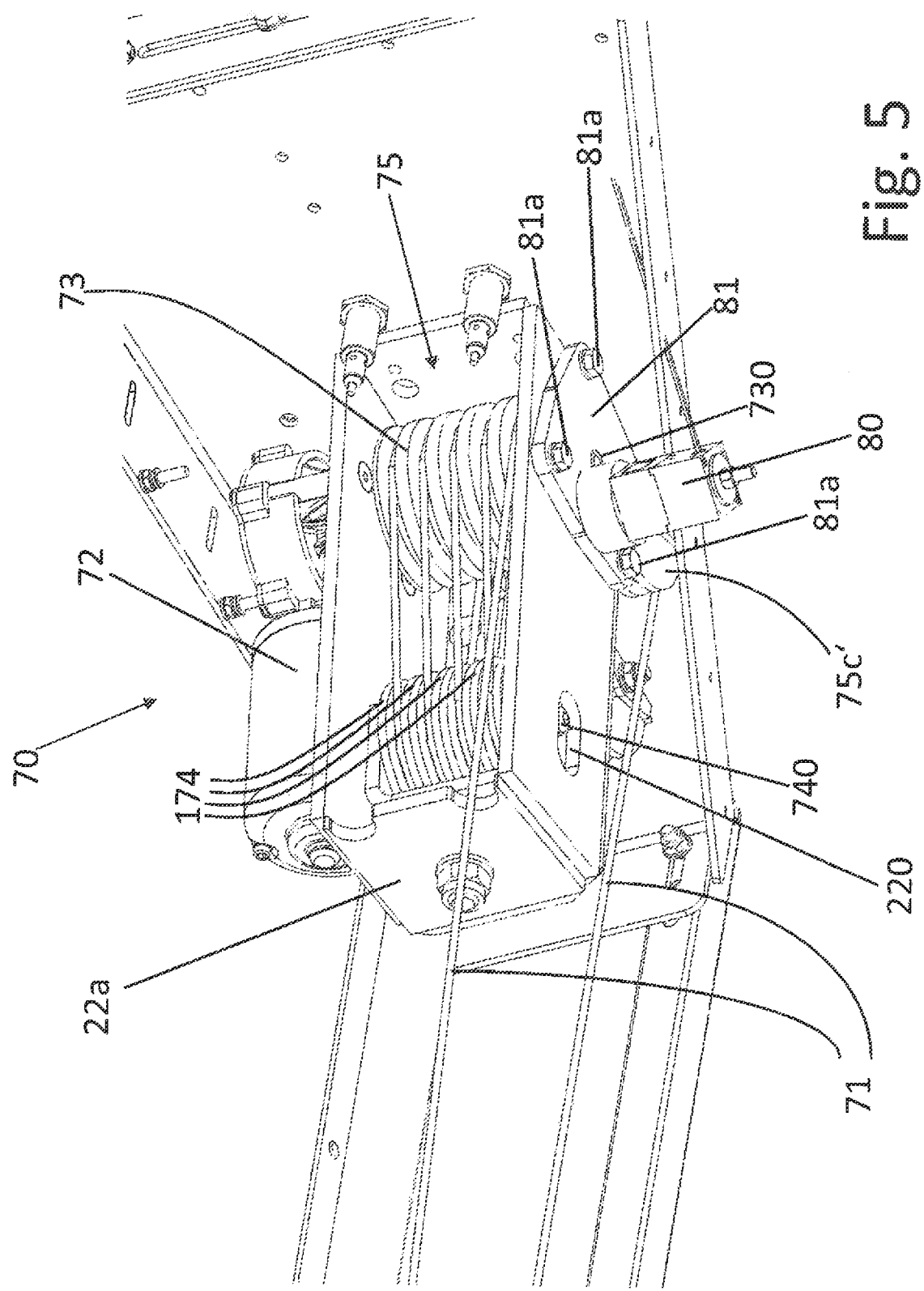
FIG. 5 shows a perspective view of the drive device of the superstructure from FIG. 1.
Figure 6:
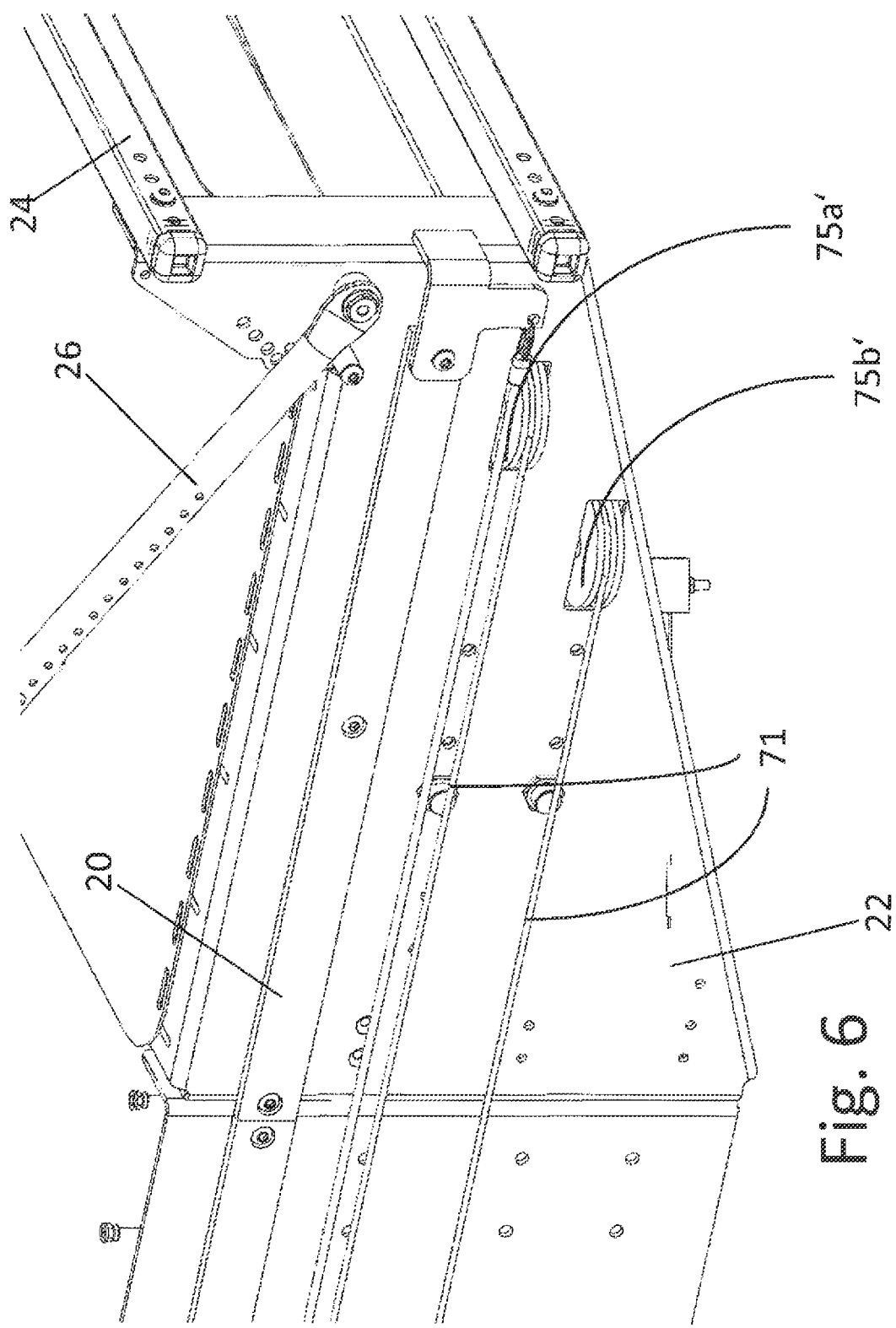
FIG. 6 shows a perspective view of a rear region of the superstructure from FIG. 1 from the side opposite FIG. 3.
Figure 7:
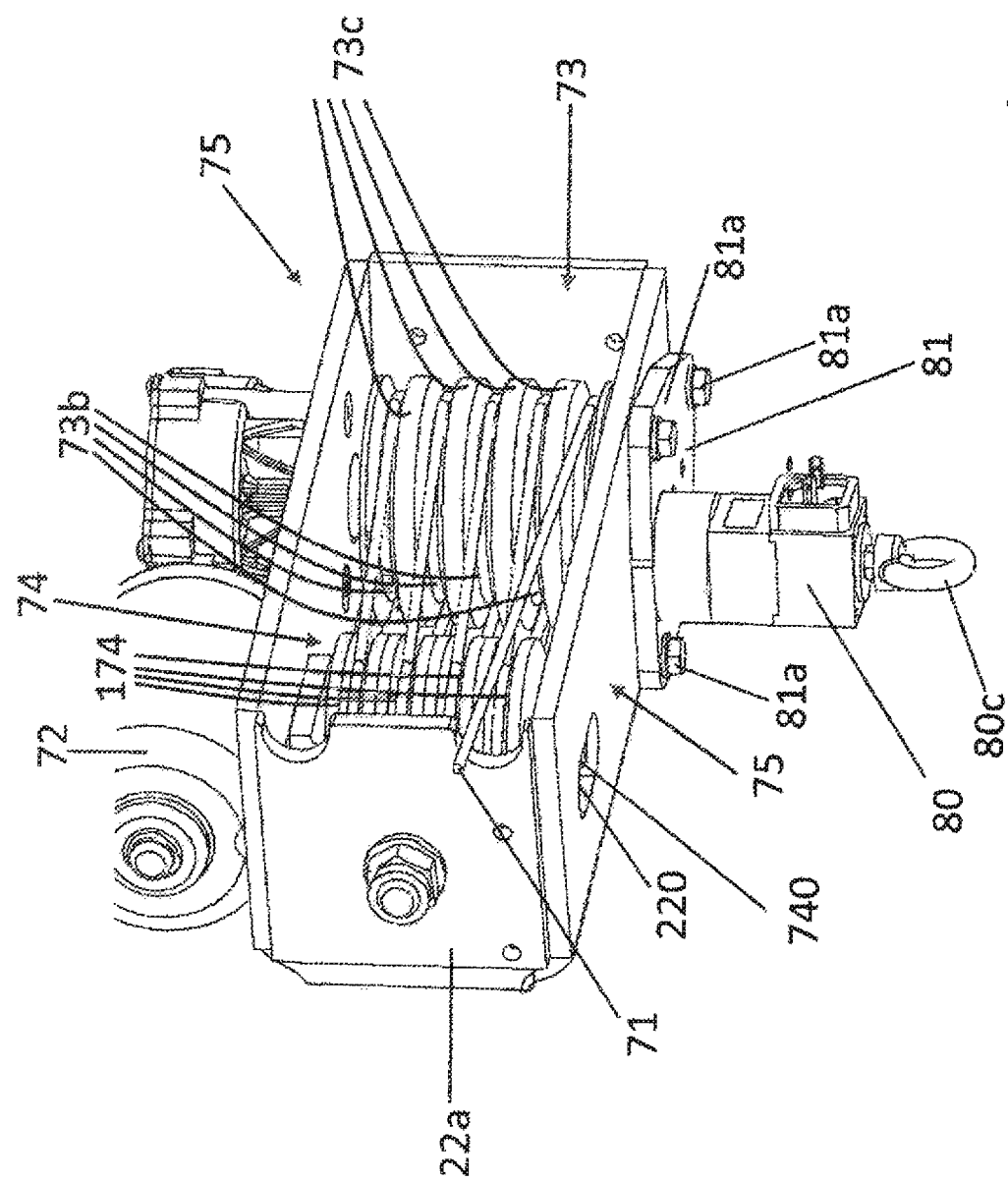
FIG. 7 shows a perspective view of the drive device of the superstructure from FIG. 1.

It can be seen in FIG. 4 that the motor 72 is connected to the top of the housing 22a, while the support plate 81 with the lifting magnet 80 is connected to the underside of the housing 22a.

In the area of the clamping arrangement 71a, a magnet is also installed, which can be detected by a sensor device for determining the position of the distal carriage 32' and thus the degree of opening of the top frame 16.

Figure 9:
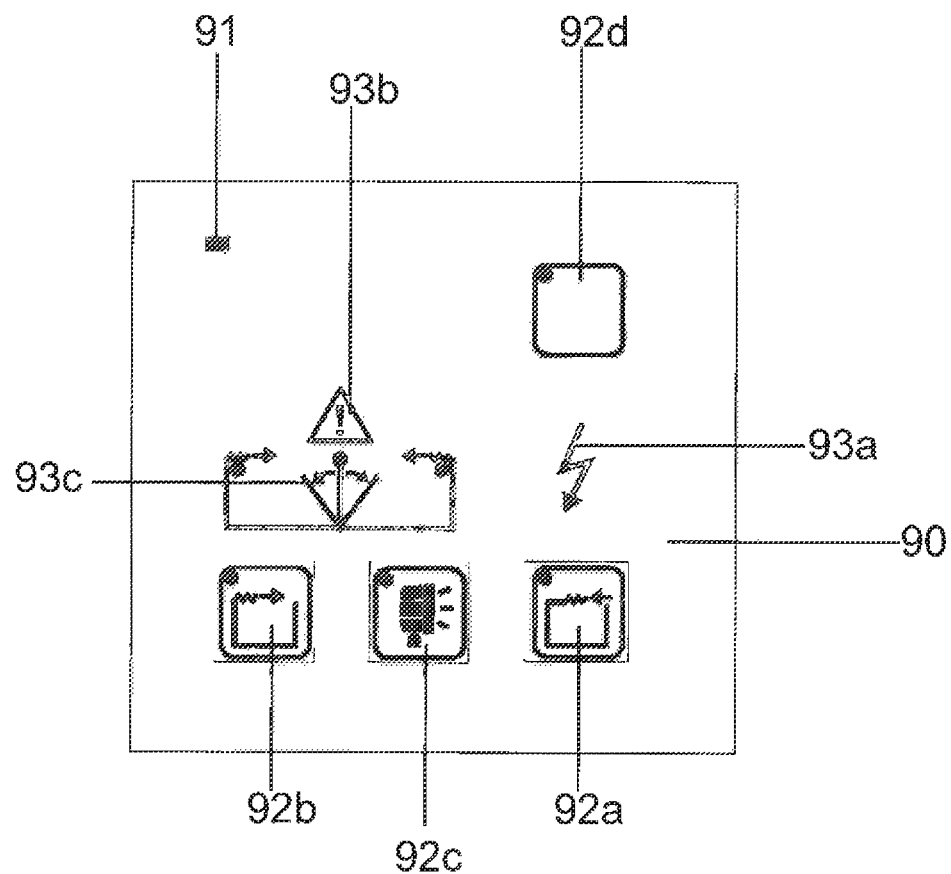
FIG. 9 shows a front view of a control panel of the superstructure from FIG. 1.

The drive 70 also has a sensor arrangement 91 designed as a gyroscope, which is accommodated in the area of a control panel 90, which is shown in FIG. 9. The sensor arrangement 91 can also be accommodated elsewhere in the superstructure 10, the substructure 14 or a vehicle transporting them.

The sensor arrangement 91 is connected to the control 99 of the drive 70. The sensor arrangement 91 can determine the inclination of the superstructure 10 to the horizontal. Limit values for permissible angles of inclination are stored in the control, and if these are exceeded, the drive 70 is put out of operation. The control panel is attached close to the drive device 75, but it is additionally or instead possible to accommodate a control panel 90 in the driver's cab of a vehicle transporting the substructure 14.

The control panel 90 comprises a first button 92a for displacing the top frame by means of the drive 70 in the opening direction and a second button 92b for displacing the top frame by means of the drive 70 in the closing direction. Both buttons 92a, 92b are connected to the control 99 of the drive 70. A further button 92c enables a worklight illuminating the interior of the substructure 14 to be switched on or off. Another button 92d enables a camera observing the interior of the substructure 14 to be switched on or off.

A display 93a on the control panel 90 signals a fault in the electrical system when it lights up. Another display 93b signals another malfunction when it lights up. Another display 93c signals when it lights up that the permissible angle of inclination has been exceeded. All buttons and displays are connected to the control 99 of the drive 70. The control panel is arranged close to the drive device 75.

The drive 70 including the motor 72 is connected to the useful output of a 24 volt energy source of the vehicle transporting the substructure 14, so that it is not necessary to equip the substructure 14, the superstructure 10 or the control designated with 99 in FIG. 1 with its own energy source. The useful output of the vehicle battery of a truck is limited to a certain power consumption, however, since the usual applications such as searchlights and the like do not represent high power consumption. Usually the useful output is fused with 20 amperes.

So that the fuse does not strike, it is advantageously provided that a first threshold value is set for the current consumption of the drive 70, which limits the power consumption of the drive 70 in normal operation. Depending on the design, the first threshold value is approximately 85% to 100% of the protected current and, in the present case, the rated current of the motor 72, 10 amperes.

However, certain sections of the travel path of the top frame 16 along the guide 20 require the handling of work peaks which may not be able to be handled with the power consumption limited by the first threshold value. This may be the case as a result of the circumstances, for example when ice or snow covers the tarpaulin 12, or when the substructure 14 and the superstructure 10 are placed in such a way that an incline has to be mastered or the load of weight is unevenly distributed on the two front carriages 32'. Furthermore, work peaks are recorded when the opening movement is started, since the relatively massive cover member 46 of the top frame 16 has to be pivoted into a raised position, wherein the pivoting work is to be performed by a stop against which a lever of the cover member 46 strikes. A further work peak can result when the tarpaulin folding aid for the tarpaulin 12, which is implemented by the two bows 36 connected to one another via the pivot angle limiters 38, has to be pushed open. In the present embodiment, the work peak is low, but if the tarpaulin folding aids are arranged in a horizontal position close to dead center, the erection is more energy-intensive.

In order to avoid overloading the motor 72, it is provided that a first period of time in which the power consumption of the drive in normal operation and thus the first threshold value for the power consumption may nevertheless be exceeded in order to cope with work peaks is not longer than 3 seconds. It is also provided here that a second threshold value for the power consumption of the drive of 20 amperes is not exceeded during the first period in order to avoid the energy supply fuse being triggered. In practice, it is sufficient if the additional power is only provided for a few tenths of a second. It is possible, but not necessary, to select the second threshold value for the power consumption at approx. 85% of the maximum value, for example at 17 amperes. The fuse of the on-board network is relatively slow and the temperature development in the region of the on-board electrical system is not very strong.

It is expediently provided that a minimum time interval is provided between two successive first time periods, which prevents the first threshold value from being exceeded in too short a succession for the power consumption of the drive, wherein the minimum time interval is selected according to the length of the first time period, i.e. 3 seconds. If the control 99 is to push open the cover member 48 and lift the tarpaulin folding aids 36, the result is a correspondingly slow movement of the distal carriage 32' over the entire length of the guide 20 until the top frame 16 is completely folded and the corresponding opening in the substructure is released.

It is possible to provide the values for the first time period and for the minimum time interval to be correspondingly shorter if the top frame 16 can or should be opened more quickly overall. It is also possible to build in a more powerful motor 72, which has a higher rated current of, for example, 20 amperes, so that the rated power is approximately doubled. For work peaks, the amount of power consumption can then be increased to over 20 amperes during the first period.

Alternatively, the anticipated power consumption of the drive 70 can also be determined by the control 99 in an arithmetic operation, whereby the drive speed of the traction element 71 can be set from dynamically determined parameters, the first threshold value and the first time period.

The above embodiment in particular ensures that even if an operator changes the opening direction several times and thus spends a longer period of time in the area of lifting either the cover member 46 or the tarpaulin folding aid 36, 38, the permissible power consumption of the vehicle battery is not exceeded.

At the same time, the power consumption of the drive can be monitored by the control in order to determine whether unforeseen obstacles are preventing or blocking the opening and closing of the superstructure 10.

Furthermore, the control provides that a power consumption of the drive which exceeds the first threshold value is also possible when the drive is stopped, in order to ensure in any case that the locking pin 80$a$ engages in the first rotating body 73.

The corresponding commands can be entered by a user via the control panel 90, but it is possible via a Bluetooth hotspot (not shown) to also enter the control commands via an external computer when the latter is connected to the hotspot. In the same way, the images from the camera and the other data on the computer, which can also be a tablet PC or a smartphone, can be displayed.

The invention has been described above using an embodiment in which the locking of the distal carriages 32' takes place via the locking pin 80$a$, the first rotating body 73 and the tension element 71. It has to be understood that, in addition, a mechanical locking of the top frame with the substructure can also be provided.

The invention has been explained above on the basis of an embodiment in which the opening and closing movement is possible starting from the distal carriage 32'. It has to be understood that in another embodiment the proximal carriage 32 of the top frame can also be coupled to the tension element 71, so that the top frame can also be opened in the other direction or in both directions.

The invention has been described above on the basis of an embodiment in which the tension element 71 drives the top frame on both distal carriages 32', which are connected to one another via the strut 34'. If the top frame is designed to be sufficiently stable, the drive can also only take place from one side, in which case an end carriage of the top frame then ensures that the force is uniformly transmitted to the carriages arranged on both sides.

The invention has been described above on the basis of an embodiment in which the struts 34, 34' are designed essentially as U-shaped bows. It has to be understood that, instead of the U-shaped bows, elongated hoops can also connect the opposing carriages 32 to one another, which then no longer extend upwards from the carriage. It is also possible that the carriages opposite with respect to a longitudinal bisector of the tarpaulin superstructure are not connected to one another by an immovable strut, but only via a bow, such as bow 36, which is articulated to the carriage. Here, however, the articulated connection can include folding panels, as are known from sliding roofs for truck superstructures, which carry a so-called lifting hoop.

The invention has been described above on the basis of an embodiment in which an operator controls the control with commands for opening and closing the top frame. It has to be understood that, in particular in the case of self-propelled systems, the commands can also be issued in an automated or computer-controlled manner, for example when a self-propelled commercial vehicle is to be loaded or unloaded.

The invention claimed is:

1. An Openable superstructure for a substructure, including a self-propelled truck, a truck, a semitrailer, a trailer, a container, a dump truck, a railway wagon, a building, or the like;
    comprising
        a collapsible top frame,
        a cover, in particular a tarpaulin, which can be connected to the top frame, and
        a drive for folding in and/or out the top frame,
    wherein the drive causes at least one tension element which is tension-resistant to move,
    wherein the at least one tension element which is tension-resistant can be coupled to a distal carriage of the top frame and moves the distal carriage back and/or forth as a function of an actuation direction of the drive,
    wherein the drive comprises a driven first rotating body,
    wherein the drive comprises a second rotating body,
    wherein the first rotating body and the second rotating body are arranged adjacent to one another and form a drive device, and
    wherein the at least one tension element which is tension-resistant is partially wound several times alternating around the first rotating body and the second rotating body.

2. The Openable superstructure according to claim 1, wherein the at least one tension element which is tension-resistant is alternatingly wound around the first rotating body and the second rotating body at least three times.

3. The Openable superstructure according to claim 2, wherein the second rotating body is driven by the at least one tension element which is tension-resistant, and wherein the first rotating body can be set into rotation by a motor of the drive.

4. The Openable superstructure according to claim 1, wherein the first rotating body is designed as a cylinder having circumferential grooves in which the at least one tension element which is tension-resistant is guided.

5. The Openable superstructure according to claim 1, wherein the first rotating body and the second rotating body have parallel axes.

6. The Openable superstructure according to claim 5, wherein the first rotating body and the second rotating body have a mutually variable distance to adjust the length of the tension element which is tension-resistant.

7. The Openable superstructure according to claim 5, wherein a spring member is arranged between the first rotating body and the second rotating body, the spring member acting on the second rotating body in a direction away from the first rotating body, thus tensioning the at least one tension element which is tension-resistant.

8. The Openable superstructure according to claim 1, wherein the second rotating body comprises a plurality of independently rotatable disk-shaped cylinder sections, and wherein the disk-shaped cylinder section is wrapped around once by approximately 180° by the at least one tension element which is tension-resistant.

9. The Openable superstructure according to claim 1, wherein power is transmitted from the first rotating body to the at least one tension element which is tension-resistant by means of friction.

10. The Openable superstructure according to claim 1, wherein a locking pin is provided which can be advanced against part of the first rotating body, and wherein the locking pin secures the first rotating body against rotation and thus blocks the distal carriage even when the drive is not driven.

11. The Openable superstructure according to claim 10, wherein the locking pin can be actuated electromagnetically between an advanced position and a retracted position.

12. The Openable superstructure according to claim 10, wherein the locking pin is loaded into an advanced position by a spring element, and wherein the locking pin is retractable from the advanced position by a lifting device against a load of the spring element.

13. The Openable superstructure according to claim 10, wherein the locking pin blocks the driven first rotating body of the drive, and wherein the locking pin can be advanced into a recess of the first rotating body.

14. The Openable superstructure according to claim 12, wherein the first rotating body, which is designed as a first cylinder, has a disk section with a plurality of holes on one end side, wherein the locking pin can be advanced into each of the holes, and wherein the first rotating body is prevented from rotating under the load of the top frame or under the power of the drive when the locking pin is engaged.

15. The Openable superstructure according to claim 10, wherein to release the locking pin the drive can initially be moved counter to an intended displacement direction, and wherein the locking pin is thereby at least temporarily relieved, in order to be able to retract the locking pin.

16. The Openable superstructure according to claim 1, wherein a sensor arrangement is provided which detects an inclination of one of the superstructure and the substructure relative to a horizontal plane and blocks the drive if the slope exceeds a limit value.

17. The Openable superstructure according to claim 16, wherein the drive comprises a control, wherein the sensor arrangement is connected to the control, that the control stores data for a maximum consumption of the drive as a function of the inclination of the substructure, and wherein the function of the drive can be deactivated for power consumption when preset maximum values are exceeded.

18. The Openable superstructure according to claim 16, wherein, when the substructure is designed as dump truck, a control of the drive causes the distal carriage to be displaced into a retracted position before an impermissible angular position detected by the sensor arrangement, which corresponds to a discharge of a load, is reached.

19. The Openable superstructure according to claim 1, wherein a first threshold value for a current consumption of the drive is provided, which limits the power consumption of the drive in a normal operation, and wherein a power consumption of the drive that exceeds the first threshold value is permitted for the duration of a first period in order to cope with work peaks.

20. The Openable superstructure according to claim 19, wherein the first threshold value for the current consumption corresponds to the rated current of a motor of the drive, wherein the first period is between 0.0001 second and 10 seconds, wherein a minimum time interval is provided between two successive first periods in which a power consumption exceeding the first threshold value is permitted, in which time interval the power consumption of the drive is limited in normal operation, and wherein the minimum time interval is at least as long as the first period.

21. The Openable superstructure according to claim 19, wherein the work peak is reached by one movement selected from the group consisting of lifting a folding device for a tarpaulin, starting the opening movement and swiveling up a bow.

22. The Openable superstructure according to claim 19, wherein a control of the drive determines the expected power consumption of the drive and dynamically sets a drive speed of the tension element to the parameters of the first threshold value and the first period as a function of the power consumption.

23. The Openable superstructure according to claim 1, wherein the at least one tension element which is tension-resistant is designed as an endless, closed tension element, and wherein the at least one tension element which is tension-resistant, is connected to said distal carriage connected to a strut which is also connected to an opposite second distal carriage connected to a common strut, and wherein the at least one tension element which is tension-resistant fixes said distal carriage connected to said strut in its position.

24. An Openable superstructure for substructure,
comprising
a collapsible top frame,
a cover, in particular a tarpaulin, which can be connected to the top frame, and
a drive for folding in and/or out the top frame, wherein the drive comprises a control and a drive device,
wherein the drive device causes an endless, closed tension element which is tension-resistant to move,
wherein the at least one tension element is coupled to at least one of two distal carriages of the top frame and moves the at least one of the two distal carriages back and/or forth as a function of an actuation direction of the drive,
wherein the at least one tension element is wound several times around the drive device,
wherein the control causes the drive to drive the at least one of two distal carriages with a power which is below a first threshold value for a power consumption of the drive in order to displace the at least one of two distal carriages,
wherein the control causes the drive to drive the distal carriages for the duration of a first period with a power which is above the first threshold value for a power consumption of the drive in order to displace the carriage when a work peak is required through the pushing open of the cover,
wherein a minimum time interval is provided between two successive first periods in which a power consumption exceeding the first threshold value is permitted, in which time interval the power consumption of the drive is limited in normal operation, and wherein the minimum time interval is at least as long as the first period.

25. An Openable superstructure for substructure, including a self-propelled truck, a truck, a semitrailer, a trailer, a container, a dump truck, a railway wagon, a building or the like;
comprising
a collapsible top frame,
a cover, in particular a tarpaulin, which can be connected to the top frame, and
a drive for folding in and/or out the top frame, wherein the drive comprises a control and a drive device,
wherein the drive device causes an endless, closed tension element which is tension-resistant to move,
wherein the at least one tension element which is tension-resistant is coupled to at least one of two distal carriages of the top frame and moves the at least one of the two distal carriages back and/or forth as a function of an actuation direction of the drive, wherein the at least one tension element which is tension-resistant is would several times around the drive device, wherein the control causes a locking pin to engage against a rotatable part of the drive when a stop position of the at least one of the two distal carriages has been reached, in order to block the distal carriages even when the drive is not driven, and wherein the control causes the drive to drive the distal carriages against a desired displacement direction of the distal carriages before the distal carriages are driven in the displacement direction, in order to disengage the locking pin and enable the release of the displacement of the distal carriages.

* * * * *